US008336769B2

(12) United States Patent
Meek et al.

(10) Patent No.: US 8,336,769 B2
(45) Date of Patent: Dec. 25, 2012

(54) BANKING SYSTEM OPERATED RESPONSIVE TO DATA READ FROM DATA BEARING RECORDS

(75) Inventors: James Meek, North Canton, OH (US); Allan R. Bakerink, Latrobe, PA (US); Bartholomew J. Frazzitta, Akron, OH (US); Randolph C. Benore, North Canton, OH (US); Daniel S. McIntyre, Uniontown, OH (US); Mark DePietro, Canton, OH (US)

(73) Assignee: Diebold, Incorporated, North Canton, OH (US)

( * ) Notice: Subject to any disclaimer, the term of this patent is extended or adjusted under 35 U.S.C. 154(b) by 0 days.

(21) Appl. No.: 13/450,957

(22) Filed: Apr. 19, 2012

(65) Prior Publication Data
US 2012/0205442 A1    Aug. 16, 2012

Related U.S. Application Data

(63) Continuation of application No. 12/931,266, filed on Jan. 27, 2011, now Pat. No. 8,235,283, which is a continuation of application No. 12/806,555, filed on Aug. 16, 2010, now Pat. No. 7,883,009, which is a continuation of application No. 12/460,631, filed on Jul. 21, 2009, now Pat. No. 7,832,632, which is a continuation of application No. 11/360,036, filed on Feb. 21, 2006, now Pat. No. 7,624,919, and a continuation-in-part of application No. 08/889,033, filed on Jul. 7, 1997, now Pat. No. 7,932,921, said application No. 11/360,036 is a continuation-in-part of application No. 09/449,426, filed on Nov. 24, 1999, now Pat. No. 7,039,600, and a continuation-in-part of application No. 10/390,342, filed on Mar. 17, 2003, now abandoned, and a continuation-in-part of application No. 11/100,149, filed on Apr. 5, 2005, now abandoned, and a continuation-in-part of application No. 11/100,148, filed on Apr. 5, 2005, now abandoned.

(60) Provisional application No. 60/655,728, filed on Feb. 22, 2005, provisional application No. 60/657,104, filed on Feb. 22, 2005, provisional application No. 60/560,054, filed on Apr. 6, 2004, provisional application No. 60/560,100, filed on Apr. 6, 2004, provisional application No. 60/365,434, filed on Mar. 18, 2002, provisional application No. 60/110,125, filed on Nov. 27, 1998, provisional application No. 60/045,794, filed on May 7, 1997.

(51) Int. Cl.
*G06F 17/60* (2006.01)
(52) U.S. Cl. ............ 235/379; 235/381; 705/10; 705/14; 705/41
(58) Field of Classification Search .................. 235/379, 235/381; 705/10, 14, 41
See application file for complete search history.

(56) References Cited

U.S. PATENT DOCUMENTS
5,305,195 A  *  4/1994  Murphy ......................... 705/1.1
(Continued)

*Primary Examiner* — Allyson Trail
(74) *Attorney, Agent, or Firm* — Ralph E. Jocke; Daniel D. Wasil; Walker & Jocke

(57) ABSTRACT

A banking system includes automated banking machines that operate responsive to data read from data bearing records. Transactions may also be carried out through communication with local and remote service providers. An automated banking machine is operative to conduct transactions including cash dispensing for users, responsive to data read from user cards and communication with a transaction host. The machine is also operative to provide output signals which drive external displays. A machine processor is operative to cause the machine to receive visual and/or audio content from content sources and to store data corresponding to the content. The content is then output through the external displays.

20 Claims, 21 Drawing Sheets

U.S. PATENT DOCUMENTS

| | | | |
|---|---|---|---|
| 5,774,663 A * | 6/1998 | Randle et al. | 709/204 |
| 5,915,246 A * | 6/1999 | Patterson et al. | 705/43 |
| 5,970,888 A * | 10/1999 | Sheppard | 109/10 |
| 6,021,400 A * | 2/2000 | Gallacher et al. | 705/43 |
| 6,044,382 A * | 3/2000 | Martino | 715/234 |
| 6,223,983 B1 * | 5/2001 | Kjonaas et al. | 235/379 |
| 6,328,207 B1 * | 12/2001 | Gregoire et al. | 235/379 |
| 6,704,039 B2 * | 3/2004 | Pena | 348/14.01 |
| 7,353,988 B1 * | 4/2008 | Ramachandran | 235/379 |
| 2004/0254837 A1 * | 12/2004 | Roshkoff | 705/14 |

* cited by examiner

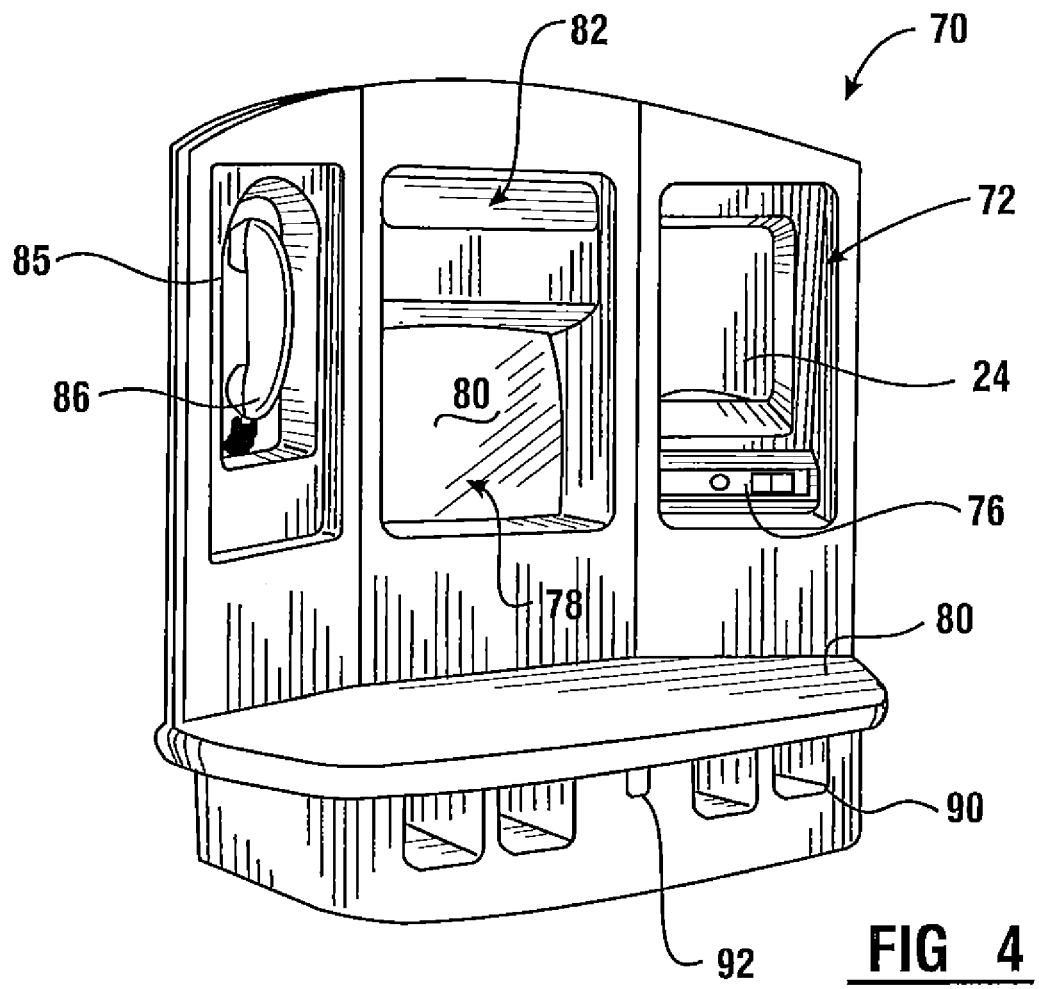
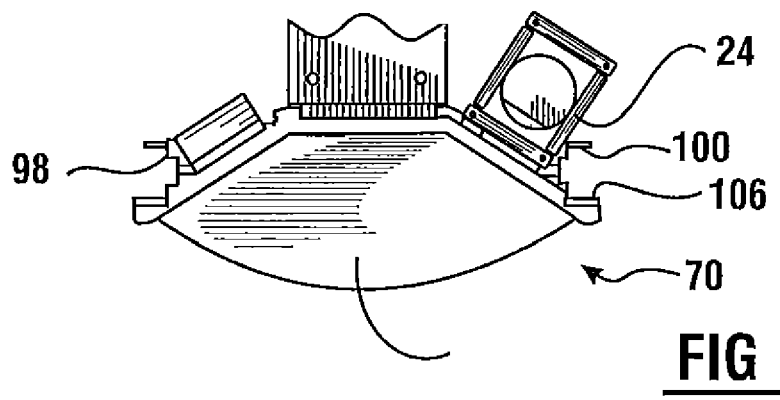

BANKING SYSTEM OPERATED RESPONSIVE TO DATA READ FROM DATA BEARING RECORDS

CROSS REFERENCE TO RELATED APPLICATIONS

This application is a continuation of U.S. application Ser. No. 12/931,266 filed Jan. 27, 2011, which is a continuation of U.S. application Ser. No. 12/806,555 filed Aug. 16, 2010, now U.S. Pat. No. 7,883,009, which is a continuation of U.S. application Ser. No. 12/460,631 filed Jul. 21, 2009, now U.S. Pat. No. 7,832,632, which is a continuation of U.S. application Ser. No. 11/360,036 filed Feb. 21, 2006, now U.S. Pat. No. 7,624,919, which claims benefit pursuant 35 U.S.C. §119 (e) of Provisional Applications 60/655,728 and 60/657,104 filed Feb. 22, 2005. Application Ser. No. 11/360,036 is a continuation-in-part of each of: U.S. application Ser. No. 08/889,033 filed Jul. 7, 1997, which claims the benefit of U.S. Provisional Application 60/045,794 filed May 7, 1997; U.S. application Ser. No. 09/449,426 filed Nov. 24, 1999, now U.S. Pat. No. 7,039,600, which claims the benefit of U.S. Provisional Application 60/110,125 filed Nov. 27, 1998; U.S. application Ser. No. 10/390,342 filed Mar. 17, 2003, now abandoned, which claims the benefit of U.S. Provisional Application 60/365,434 filed Mar. 18, 2002; U.S. application Ser. No. 11/100,149 filed Apr. 5, 2005, now abandoned, which claims the benefit of U.S. Provisional Application 60/560,100 filed Apr. 6, 2004; and U.S. application Ser. No. 11/100,148 filed Apr. 5, 2005, now abandoned, which claims the benefit of U.S. Provisional Application 60/560,054 filed Apr. 6, 2004. The disclosures of all of the above mentioned applications are herein incorporated by reference in their entirety.

TECHNICAL FIELD

This invention relates to automated banking machines that operate responsive to data bearing records such as user cards and which may be classified in U.S. Class 235, Subclass 379.

BACKGROUND OF INVENTION

Automated banking machines have been developed which enable customers to carry out banking transactions. Such banking transactions often include receiving cash, making deposits of funds, transferring funds between accounts, making balance inquiries, paying bills and cashing checks. The capability of providing general advertising and/or targeting marketing messages to the user of a banking machine has been developed and is disclosed in patent applications from which this application claims priority.

Systems have also been developed in which transactions can be carried out remotely with a service provider. Such transactions can be carried out by exchanging items with a remote service provider through a transport system. Alternatively, such a system may include transaction function devices like those included in an automated banking machine, such as an automated teller machine (ATM) at the customer station. Selected communication including general advertising and targeted marketing messages may also be delivered to transaction customers in these systems. Systems of this type are also disclosed in the prior applications of which this application claims priority.

Prior systems would benefit from further improvements.

OBJECTS OF EXEMPLARY EMBODIMENTS

It is an object of an exemplary embodiment to provide a system for carrying out transactions.

It is a further object of an exemplary embodiment to provide a system in which an ATM operates to carry out transactions and which provides outputs through external displays that are not a part of the ATM.

It is a further object of an exemplary embodiment to provide a system for carrying out transactions that provides a customer with information between transactions.

It is a further object of an exemplary embodiment to provide a system for carrying out transactions that provides customers with targeted marketing.

It is a further object of an exemplary embodiment to provide a system in which a service provider can assist a customer in carrying out a transaction at an ATM.

It is a further object of an exemplary embodiment to provide a system in which customers may receive assistance from a plurality of service providers.

It is a further object of an exemplary embodiment to provide methods for carrying out transactions.

Further objects of exemplary embodiments will be made apparent in the following Detailed Description of Exemplary Embodiments and the appended claims.

Certain of the foregoing objects are accomplished in an exemplary embodiment by a system which includes a service provider (SP) station and a plurality of customer stations located at a transaction facility. The service provider station includes a visual display and a closed circuit television (CCTV) camera. The service provider station also includes a device for transmitting and receiving audio signals such as a microphone and speaker unit. The service provider station may also include a pneumatic tube carrier delivery and receiving device. A queuing display is also included at the service provider station to indicate to the service provider the customer station which should be serviced next.

Each of the exemplary customer stations includes a visual display that can be selectively connected to the CCTV camera at the service provider station. The customer station also includes a CCTV camera that can be selectively connected to the visual display at the service provider station. The customer station also includes an audio transmission and receiving device which enables a customer to communicate orally with a service provider at the service provider station. The exemplary customer station also includes a device for delivering and receiving a pneumatic tube carrier that can be transmitted through a tube by pressure or vacuum. Customer stations may also include other devices such as card readers, biometric readers, check imagers and cash dispensers.

The exemplary service provider station is connected to each of a plurality of customer stations. Tubing for transmitting a pneumatic carrier extends between the service provider station and each of the customer stations. The service provider station also includes a control unit that enables a service provider to connect to and communicate with a customer as well as to connect devices or to transmit signals between a selected customer station.

An exemplary service provider station may also be connected to at least one customer station that includes an automated transaction machine. The automated transaction machine may comprise an automated banking machine, such as an ATM. Each ATM includes a visual display, CCTV camera, and audio transmission and receiving devices and other transaction function devices. The visual and audio devices at an ATM are operatively connected with a service provider station in a manner similar to the visual and audio devices of other customer stations.

In some exemplary embodiments customer stations and/or service provider stations at the transaction facility may be operatively connected to remote service provider stations.

These remote service provider stations may be accessed through one or more networks. In exemplary embodiments remote service providers having access to more information, particular expertise or greater authority may communicate directly with the customer and/or the service provider at the transaction facility. In exemplary embodiments the remote service provider may communicate through audiovisual communication with the customer at the transaction station and/or the local service provider to help the customer carry out transactions. It should be understood that for purposes of this disclosure, "transactions" shall include, but not be limited to, arrangements involving exchanges of value, contracting activities, providing assurances, providing information or otherwise dealing with situations presented by the customer.

Further in exemplary embodiments both the local service provider and the remote service provider may have the capability to control outputs to the customer through the customer terminal. This may include for example providing inputs that control outputs through the customer visual display and/or audio output device. For example a local remote service provider may control a virtual pointer which is movable on the customer display to point out options or information. Such a pointer may also be used to show a customer which input devices to use, such as buttons adjacent to a screen or icons presented on a touch screen. In exemplary embodiments local or remote service providers may also display stored presentations to the customer. This may include presentations stored in a data store, which explain particular aspects of transactions or which include promotional messages.

In some exemplary embodiments local or remote service providers may provide inputs that connect the visual display or audio transmitting devices at the customer station to a broadcast source. The broadcast source may be a source of audio and/or visual outputs located at the transaction facility. Alternatively the broadcast source may be a remote source. Remote sources may be accessed numerous ways such as through networks, satellite, cable, wired or wireless connections. An exemplary embodiment includes a broadcast source that includes a video material presentation device which provides video program material. The presentation device is connected to the customer stations through a video switching device. The video material presenting device provides video information that is intended to be of interest to the customers who use the system. The video switching device operates to present the video material on the display of the customer station except when the customer and the service provider are in communication.

In some alternative embodiments, data corresponding to presentations received from one or more remote computers which serve as a broadcast source may be stored in one or more data stores. This content may thereafter be output through displays located on customer stations and/or the display of an ATM. In some exemplary embodiments, data corresponding to broadcast content may be stored in a data store located within an ATM. One or more processors of the ATM may be operative to provide output signals from the ATM that drive external displays and cause the output of content on the external displays. This may be done independent of the cash dispensing and other ATM transaction functions that are also carried through operation of the at least one ATM processor.

In some exemplary embodiments, the ATM processor may operate in accordance with its programming to cause the ATM to communicate only periodically with one or more broadcast sources. During such communication the processor may operate to update the information corresponding to content stored in the data store. Thus, for example, the processor may update content corresponding to items such as recent news events, recent sporting events, recent stock prices, weather forecasts and other information that is obtained from one or more remote broadcast sources. Alternatively or in addition, the at least one processor may operate to store in the at least one data store, presentations corresponding to advertising appropriate for the facility in which the system or ATM is located. This may include, for example, advertising material for the particular financial institution in which the presentations are output.

For example, in some exemplary embodiments the ATM may operate to communicate with a remote transaction host so as to carry out cash dispensing and other financial transactions through the ATM. In the course of these transactions, the outputs through the ATM display are controlled responsive to the communications with the transaction host. Concurrently, the at least one processor in the ATM may be operative to provide signals which cause the output of content on one or more display screens which are separate from the ATM. This content will be different from that output during the same time period from the display of the ATM, and will correspond to presentations received from the one or more remote broadcast sources.

Alternatively or in addition, exemplary embodiments may include provisions for causing the ATM to communicate with one or more remote computers which cause data corresponding to a plurality of advertising presentations to be stored in one or more data stores. In some exemplary embodiments, data corresponding to the plurality of advertising presentations will be stored in a data store in the ATM. During operation of the ATM or other transaction system, the ATM may operate to communicate with one or more remote marketing computers. In exemplary embodiments, these marketing computers may receive data corresponding to the particular customer operating the ATM. Based on this data received, the remote marketing computer may determine an advertising presentation appropriate for the particular individual and return a message to the ATM or other device, which indicates what particular marketing presentation or presentations to present to that particular user. This may be done at ATMs or other types of customer stations in the manner described in the incorporated disclosures such as that the advertising presentations are determined by communication with the marketing server at a time in the transaction prior to ATM communications with a transaction host or other remote computer. In this way, advertising presentations are promptly presented to the user during the financial transaction at opportune times and so as to minimize the risk of delaying the completion of the transaction as a result of the marketing presentation. Of course, these approaches are exemplary of approaches that may be used.

In an exemplary embodiment when the customer approaches the customer station he or she is enabled to contact the local service provider located at the transaction facility with the customer station. One or more controllers which serve as a switching device responds to the service provider so that the service provider is in visual and audio communication with the customer at the customer station. This enables the local service provider to communicate with the customer as well as to receive documents from the customer through the carrier which is transmitted through a pneumatic tube.

Although the customer conducting transactions at an exemplary customer station will still engage in activities which in other environments would result in unproductive time for the service provider, the service provider is enabled to switch to communication with other customer stations to move other transactions forward while waiting for the customer. The ability of the service provider to minimize unproductive time while waiting for the customer improves service for all customers using the system. The queuing display at the service provider station indicates the customer station where the next customer who should be serviced is located.

In an exemplary embodiment if the customer needs to conduct a portion of a transaction that would benefit from authority or expertise that is not available to the local service provider the customer station may be connected through operation of the one or more controllers to a remote service provider. In the exemplary embodiment the customer is placed in video and audio communication with a remote service provider station that is located away from the transaction facility and which is staffed by a remote service provider. The connection to the remote service provider station is made responsive to inputs provided to one or more input devices by the customer and/or local service provider. The remote service provider communicates with the customer and enables the customer to carry out at least a portion of a transaction. In the exemplary embodiment during the time that the customer is dealing with the remote service provider, the local service provider may be servicing other customers, thereby avoiding idle time. In addition in exemplary embodiments a local service provider may be monitoring the communications between the customer and the remote service provider so that the local service provider can complete the transaction once the remote service provider is finished dealing with the customer.

In exemplary embodiments the local and/or remote service provider is enabled to provide connections between the transaction function devices located at the customer station and devices and systems for carrying out transactions. This may include for example switching data input by the customer at the customer station to a card reader, PIN pad, biometric reader, or other device to an appropriate system to verify the identity of the customer. Alternatively the local and/or remote service provider may have the capability in some embodiments to operate transaction function devices such as cash dispensers, to deliver cash to the customer. In other embodiments local and/or remote service providers may be provided with the capability of retrieving images produced by a check imaging device at the customer station, so as to access images of checks that are input by the customer.

In still other alternative embodiments the local and/or remote service provider may provide inputs so as to control the outputs through the customer station so as to guide the user through a transaction. For example the local or remote service provider may use a pointer to highlight aspects of particular outputs that are made through the customer display of the customer station. This may be done with a pointer, electronic highlighter or other appropriate indicating device. Alternatively service providers may point out function buttons or icons on a touch screen that a customer is to press to engage in particular transaction functions. In still other embodiments service providers may provide inputs so as to direct the system to output stored presentations of a designated type applicable to the customer's transaction through the customer station. This may be done for example by the service provider designating a stored presentation for which there is corresponding data is stored in a database, and which can be output through the customer display and audio transmitting device of the customer station. In still other embodiments the service providers can provide inputs which connect the customer station to a broadcast source.

In still other embodiments where the customer station includes an ATM, the ATM may be operatively connected through one or more networks, with a financial transaction system. This may enable the ATM to conduct transactions such as the dispensing of cash without the involvement of local or remote service providers. In still other embodiments sensors are provided for detecting customers adjacent to the customer transaction station so that a service provider can initiate communication with the customer and/or know when a customer has left the vicinity of the customer station. In still other embodiments connections to the broadcast source or other stored presentations may be made through operation of the ATM or connected financial transaction system.

BRIEF DESCRIPTION OF DRAWINGS

FIG. 3 is a top sectional view of the customer station taken along line 3-3 in FIG. 1.

FIG. 4 is a right front perspective view of the customer interface of the customer station shown in FIG. 1.

DETAILED DESCRIPTION OF EXEMPLARY EMBODIMENTS

Figure 10:
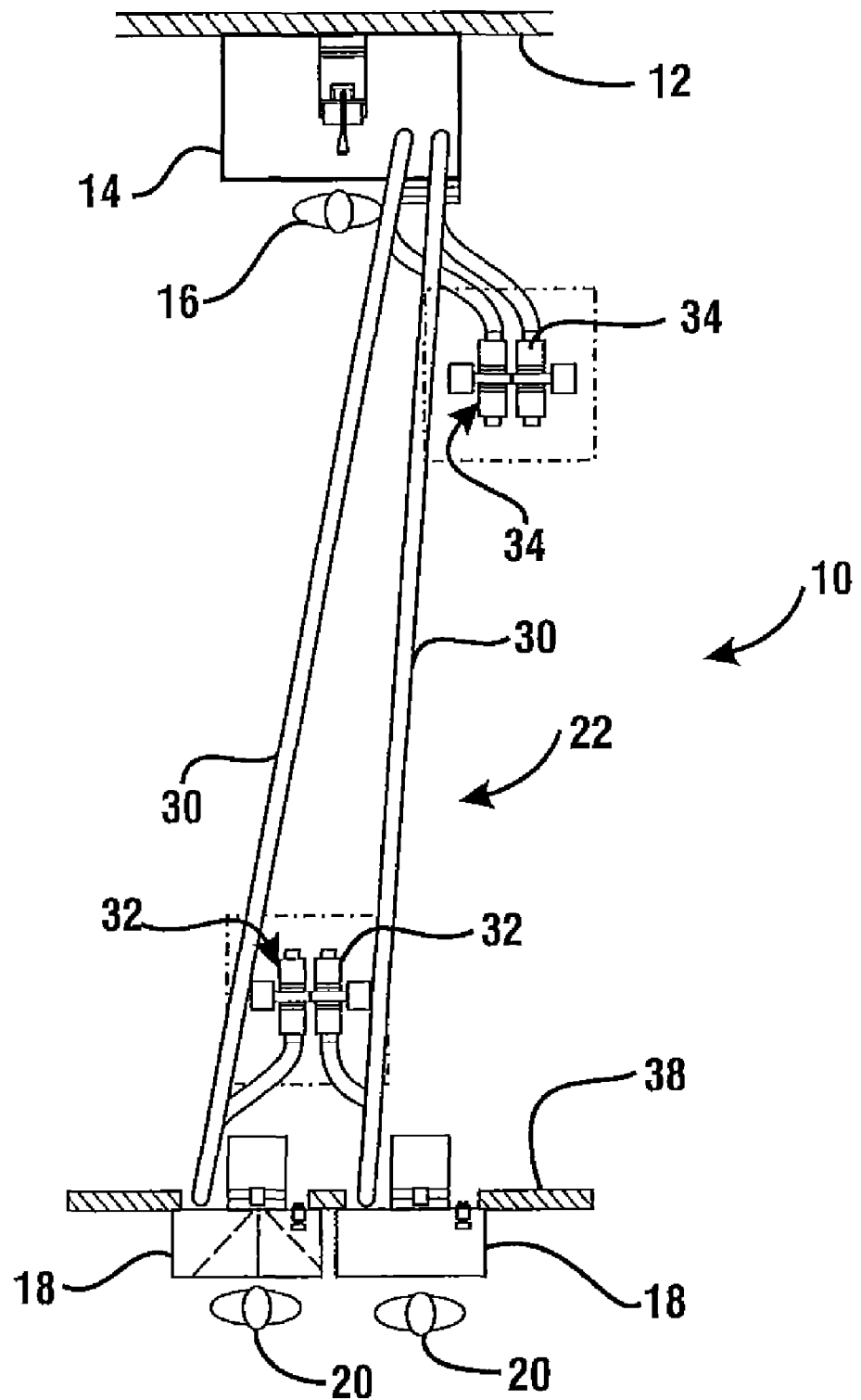
FIG. 10 is a top schematic view of a service provider station and customer stations used in a transaction system of an exemplary embodiment.

Referring now to the drawings and particularly to FIG. 10 there is shown therein an exemplary embodiment of a transaction system generally indicated 10. This system is used within a building or other transaction facility generally indicated 12, in which transactions are conducted. The embodiment of the system shown is specifically adapted for conducting banking type transactions and the exemplary transaction facility comprises a bank. It should be understood however that embodiments may be used in connection with a variety of transaction environments including gaming, ticketing, postal and other business environments where customers have in the past been served by a service provider positioned behind a desk, counter, or window.

The exemplary system includes a service provider (SP) station generally indicated 14. A service provider generally indicated 16 operates the components and equipment at the SP station. In the case of the embodiment of the system shown, the service provider is a teller or other bank employee that carries out transactions for customers in a manner which is later described.

The exemplary system also includes a plurality of customer stations 18. Customers generally indicated 20, operate the customer stations 18 to carry out transactions with the service provider 16 in a manner that is later described in detail.

Figure 11:
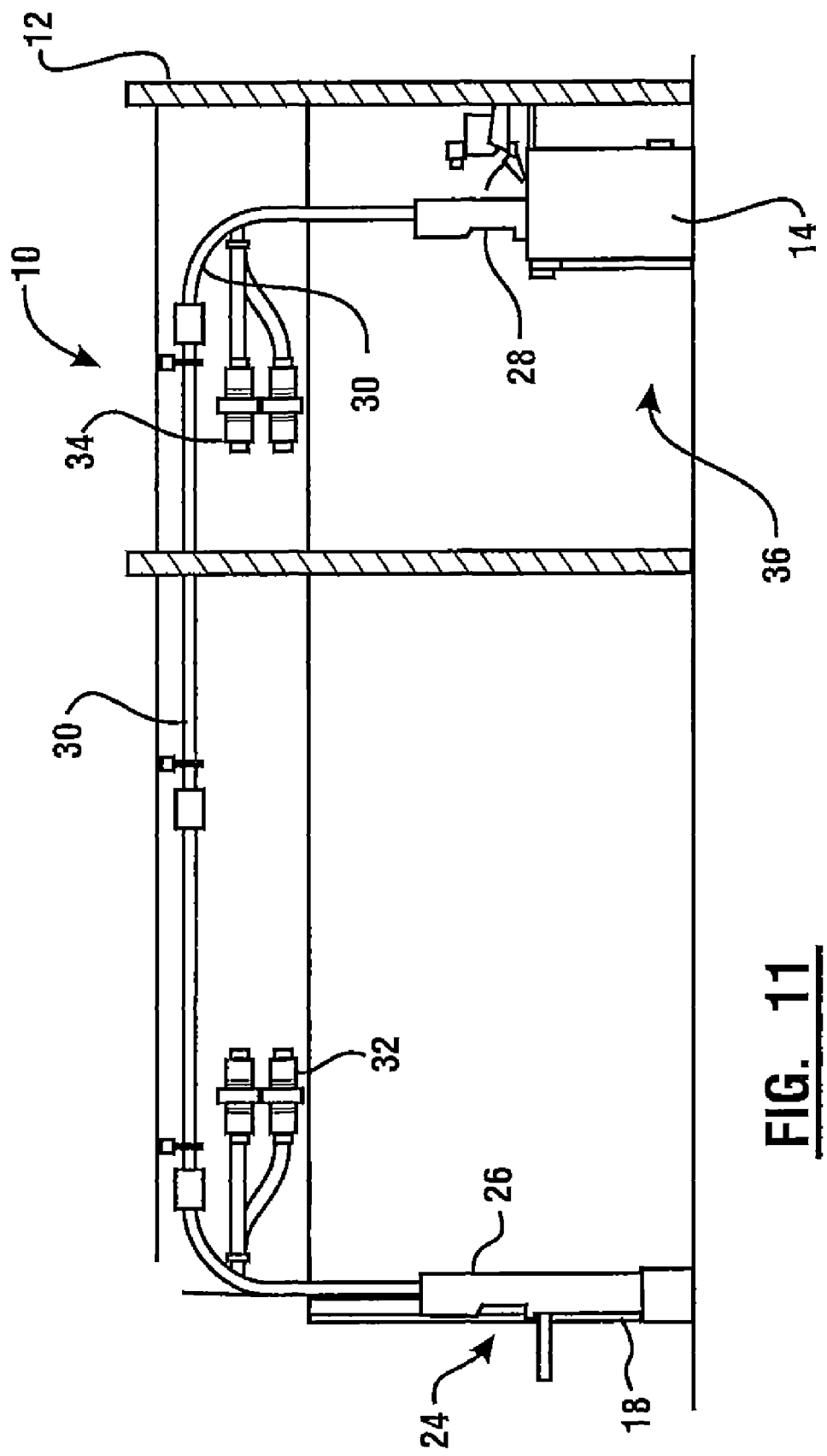
FIG. 11 is a side schematic view of the system shown in FIG. 10.

The customer stations 18 and service provider station 14 have extending between them an item conveyor which in the exemplary embodiment comprises a pneumatic tube type transport system generally indicated 22. As shown in FIG. 10 each customer station 18 is connected to the SP station by a carrier tube 30. The customer station includes a pneumatic pressure/vacuum tube carrier delivery and receiving device 24 which can send a carrier 26 to the SP station and which can receive a carrier from the SP station (see FIG. 11). The SP station also includes an air pressure tube carrier and delivery and receiving device 28 which is used to send the carrier 26 to the customer station 18, and to receive the carrier from the customer station. The carrier holds items removably positioned therein and enables items to be moved between the SP station and the customer station.

Carrier delivery and receiving devices 24 and 28 are connected by the carrier tube 30 through which carrier 26 passes. The carrier is propelled through the tube by differences in air pressure and specifically positive air pressure and/or vacuum produced by blowers 32 and 34. Movement of the carrier is accomplished by operating the blowers to produce a differential in air pressure in the tube which is sufficient to move the carrier from one station to another. In the exemplary embodiment blowers 32 and 34 are a blower package, which along with the tube and carriers are commercially available from Diebold, Incorporated. Of course in other embodiments other types of item conveyors may be used.

In the exemplary embodiment the SP station is positioned within a secure room generally indicated 36 within the building 10. Positioning the SP station 14 in such a secure room provides physical structure such as one or more walls between the service provider and the customer and avoids direct visual observation of the service provider which enhances security and minimizes the risk that the service provider will be subject to robbery or physical harm. In addition, in the exemplary embodiment the customer stations 18 are built into a building wall generally indicated 38. Building wall 38 may be an interior wall of the building 12. As later discussed, an advantage of some exemplary embodiments is that the customer stations may be readily installed in a building wall and require a minimum of surrounding floor space.

Figure 8:
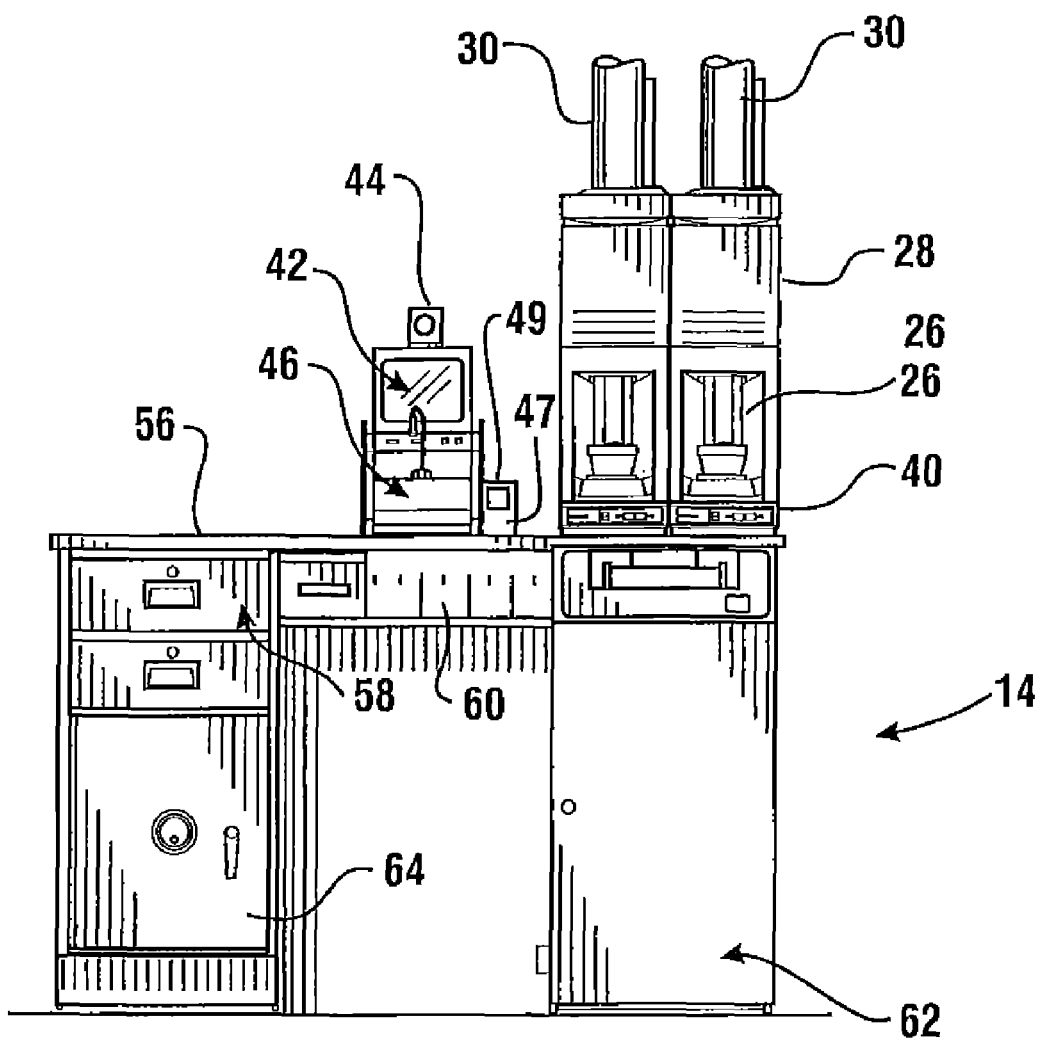
FIG. 8 is an elevational view of a first embodiment of a service provider station.

The service provider (SP) station 14 of system 10 is shown in greater detail in FIG. 8. The SP station includes two carrier delivery and receiving terminal devices 28. Carriers 26 may be transmitted to and from the customer stations 18 through the terminal devices 28. The delivery and receiving terminal devices 28 each include a control panel 40. The control panel 40 includes input devices such as buttons which the service provider presses to control the operation of blowers 32 and 34 which cause the carriers 26 to move.

The service provider station 14 further includes a visual display 42. Visual display 42 is preferably a closed circuit television (CCTV) monitor. SP station 14 further includes a CCTV camera 44. Camera 44 is preferably positioned adjacent to the visual display 42 so that when the service provider views the customer at a customer station on display 42, camera 44 provides an image of the service provider on a visual display at the customer station. The service provider appears to be looking at the customer as a result of this arrangement.

SP station 14 further includes a communication selector unit 46. Communication selector unit 46 includes an audio transmission and receiving device including a microphone and a speaker. Unit 46 further preferably includes selector buttons or other input devices by which the service provider may selectively actuate to establish video and audio connections between the SP station and a selected customer station. The exemplary video/audio communication selector unit 46 further includes an indicator such as a light which is used to indicate to the service provider that a customer is present at a particular customer station. This is done in a manner that is later explained.

The communication selector unit 46 is in operative connection with a communication controller. The communication controller may include one or more programmable microprocessor based controllers which are operative to selectively establish audio and video communication between the SP station and a particular customer station responsive to the service provider's inputs to the input devices on unit 46. The SP station 14 is also in operative connection through the communication controller with a video switching device generally indicated 48 in FIG. 12. The video switching device is preferably a video matrix switcher commercially available from Diebold, Incorporated. The video switching device is operatively connected to the camera 44 and display 42 of the SP station 14 as well as to the visual displays and cameras located at the customer stations.

A video material presentation device generally indicated 50 is operatively connected to the video switching device 48. In the exemplary embodiment the video material presentation device is a computer which includes a data store therein. The data store stores data representative of video and/or audio material. In the exemplary embodiment the device 48 serves as a broadcast source to present the video/audio material stored on media such as in the data store of the computer such as advertising, promotional information or other material which is intended to be of interest to customers who use the system. In alternative embodiments the video material presentation device could be a playback device such as a VCR or DVD player, which is in connection with local media such as CDs, DVDs, or tapes. It should be understood that these broadcast sources are merely examples. In addition it should be understood that such broadcast sources may provide video content, audio content, or both.

Alternatively the broadcast source may comprise a remote source of audio or visual content. Such a remote source may be accessed through an online or other connection or wirelessly via radio, television, satellite, or other connection that is operative to deliver the content. Again it should be understood that these types of broadcast sources and the content accessible therefrom as well as ways of communicating therewith are exemplary.

In an exemplary embodiment the computer 50 is connected to a data transmission line 52 through a communications device 54. The communications device may be a modem or other interface and the data transmission line is a phone or data line or other device which is suitable for placing the computer that serves as the video material presentation device in communication with a remote broadcast source. As will be appreciated by those skilled in the art this configuration enables the video and/or audio information that is stored in the computer to be changed and updated on a periodic scheduled or unscheduled basis from a local or remote location. This enables the information stored in the data store of the computer to be maintained as current and accurate as may be desired by the operator of the system.

It should be understood that the computer which serves as the video material presentation device may be located immediately adjacent to the SP station 14, or may be remotely located and connected to the video switching device 48 by a data transmission line, radio link, or other communications apparatus.

In some exemplary embodiments the system may be in operative connection with one or more computers with associated data stores that include data corresponding to a plurality of audio, video, or audiovisual presentations. Such computers may be located at the transaction facility or may be remotely located and accessible via communications link. Such stored presentations may be accessed and presented to customers selectively by service providers. This may be done by providing inputs to input devices in a manner that is later discussed in more detail. Thus for example a service provider who wishes to present to a customer a particular presentation may elect to do so by providing a corresponding input to an input device such as a keyboard, touch screen, or other input device located at a service provider station. In response to such input the desired presentation will be output and provided to the selected customer. While the customer is receiving the designated presentation the service provider can be monitoring the customer's activities, assisting in explaining aspects of the presentation or serving other customers.

In some embodiments the presentations may be interactive such that the customer can provide inputs in response to a series of questions that are presented to the customer through the visual display of a customer station. In some embodiments the customer stations may have associated therewith processors and data stores such that the presentations are locally stored at the customer terminal. This may be done in situations where the customer terminal is of various types including customer terminals that include ATMs. In some embodiments the stored presentations may be stored and presented in a manner like that described in U.S. patent application Ser. No. 09/449,426 filed Nov. 24, 1999, the disclosure of which is herein incorporated by reference. It should be understood however that in exemplary embodiments presentations may be selectively provided based on customer information as described in the incorporated disclosure, but alternatively or in addition based on inputs provided by service providers. Likewise in some embodiments the presentations may be stored in a data store associated with one or more computers at the transaction facility, or alternatively, remotely stored relative to the transaction facility and accessible through a suitable communications link. Alternatively some presentations may be stored locally and others may be accessed remotely. Various systems configurations may be used depending on the nature of the particular system.

The exemplary SP station 14 also includes a queuing indicator 47. The queuing indicator 47 includes a display 49, such as an LED or LCD type. The queuing indicator 47 also preferably includes a processor and a memory therein which enables it to carry out programmed functions and also serves as a timing device. The queuing indicator 47 provides an indication on its display 49 of the customer station where the next customer to be serviced is located. The queuing indicator operates in a manner later explained and assures that the service provider can service the customers in the order that they approached the customer stations.

As shown in FIG. 8 exemplary SP station 14 further includes other components which are tailored to the particular types of transactions being performed. As shown in FIG. 8 the SP station 14 includes a working surface 56 which provides the service provider room to review and prepare materials associated with the transactions.

The SP station 14 further includes storage drawers 58 and open storage locations 60 for items that the service provider may need while performing their work. As the exemplary embodiment of the system 10 is intended for use in a banking environment, the SP station 14 further includes a currency bill dispensing device 62. Currency dispensing device 62 is of a known type which dispenses bills and coinage to the service provider in amounts requested. This avoids the need for the service provider to count amounts of money when needed for delivery to a customer. The service provider station further includes a built in safe generally indicated 64 which provides secure storage for valuable items, such as checks and currency.

It should be understood that other embodiments may include different or additional devices at the SP station which are needed in the particular transaction environment in which the system is used. These may include, for example, credit card authorization devices, input devices, output devices, ticket printers, betting slip printers, stamp dispensers, chip dispensers, medicine dispensers or other items or systems connections which are needed to carry out the particular types of transactions required in the environment in which the system is used.

Figure 9:
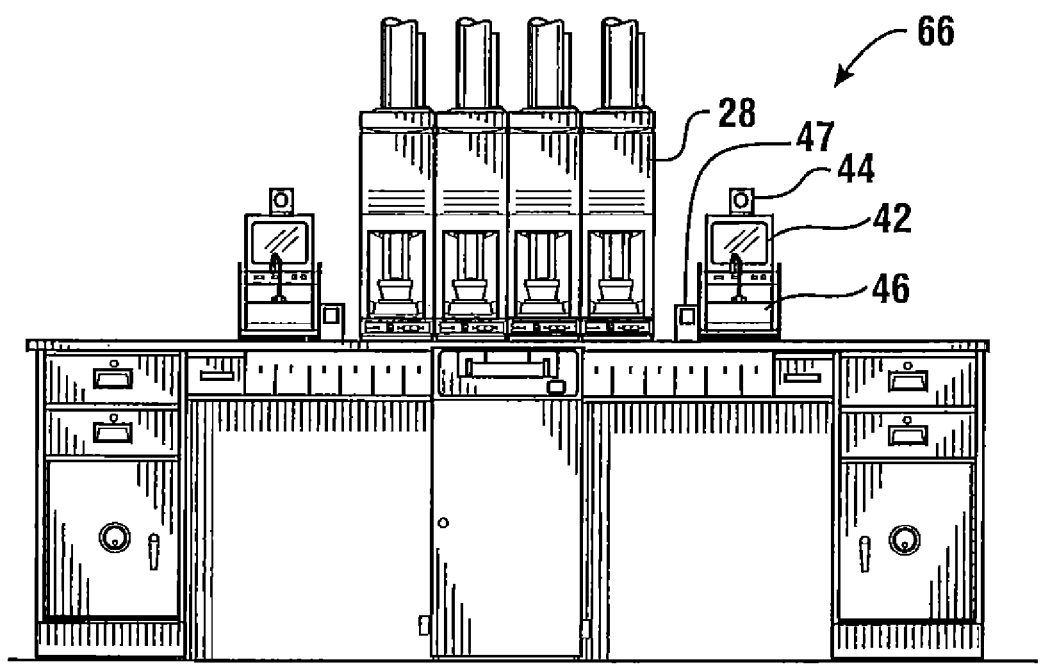
FIG. 9 is an elevational view of a second embodiment of a service provider station.

FIG. 9 shows an alternative service provider station 66. Alternative SP station 66 is similar to SP station 14 except that it includes additional carrier delivery and receiving terminal devices 28. The alternative SP station 66 also includes additional displays 42, cameras 44, and communication selector units 46. The alternative SP station 66 is arranged for a system where two service providers may share a single currency dispensing device 62. Alternatively, SP station 66 may be used by a single service provider who operates all of the components thereon.

It should be understood however, that while the SP stations 14 and 66 have been shown as having two customer stations 18 associated with a single display and communication selector unit, in other embodiments other numbers of customer terminals may be configured to be serviced from a single selector unit by a service provider. The configuration of the system may be tailored to the transaction environment in which it is used.

An exemplary embodiment of the customer stations 18 is shown in greater detail in FIGS. 1 through 7. Customer station 18 is positioned on a wall 38 of building 12. Although wall 38 can be virtually any wall, an advantage of the exemplary embodiment is that wall 38 is an interior wall which may be a facade with very limited room behind it. This enables positioning the customer stations in ways that maximize available space within the interior of the building.

Customer station 18 includes a cover 68 which in the operative position of the station abuts wall 38 as shown. As later explained, cover 68 is moveable in the exemplary embodiment so as to provide access for servicing the components of the customer station.

Cover 68 has thereon a customer interface area 70 which is shown in greater detail in FIG. 4. The customer interface area includes a carrier opening 72 which extends through the cover 68. The pneumatic tube carrier delivery and receiving terminal device 24 is accessible through opening 72 in the operative position of cover 68. Carrier delivery and receiving terminal device 24 operates to send and receive carriers 26 through the pneumatic tube system 22, to and from the service provider terminal. Carrier delivery and receiving terminal device 24 includes a control panel 76 with buttons thereon so that a customer may control the operation of blowers 32 and 34 in the manner previously explained to send a carrier from the customer station to the SP station. Control panel 76 preferably also includes a button that a customer can press to call the service provider at the service provider station. Alternative customer stations may include other or additional types of devices. For example, customer stations may include input devices such as keyboards, function keys, keypads, card readers, biometric input devices, or other type devices through which data may be received. The types of devices included will depend on the particular type of system and the transaction environment in which it is used.

Customer interface area 70 of cover 68 further includes a screen access opening 78. In the operative position of the customer station, a visual display 80 is enabled to be viewed by the customer through the screen access opening 78 in the cover 68. Interface area 70 further includes a camera viewing opening 82. Camera viewing opening 82 is positioned so that in operative position of the customer station a CCTV camera 84 (see FIG. 5) is enabled to view the customer through opening 82 in the cover.

Customer interface area 70 of the exemplary embodiment further includes an accessory opening 85. An audio transmitting and receiving device 86 is positioned in accessory opening 85. In the exemplary embodiment the audio transmitting and receiving device 86 is a telephone type handset. The customer at the customer station 18 is enabled to communicate with a service provider at the SP station through the handset. This provides added privacy. A microphone and speaker are also preferably built into terminal device 24 and may be used to communicate with the customer when the handset is not in use. In the exemplary embodiment the handset is in connection with a switch which operates to switch audio communication from the microphone and speaker to the handset when the handset is raised and to return to the microphone and speaker when the handset is replaced. The handset switch is also preferably used to signal the service provider in a manner similar to the "call button" on the control panel 76 when the customer first approaches the customer station. Of course, in alternative embodiments, the handset may be deleted and/or other types of microphone and speaker arrangements may be used.

In the exemplary embodiment of the customer station 18 the carrier opening 72 and the accessory opening 85 are positioned in mirror image relation on the cover 68. This enables the positions of the terminal device 24 and the audio transmission and receiving device 86 to be reversed from those shown in FIG. 4. Alternatively, in customer stations that do not have one of these components the unused opening may be closed by an insert attached to the cover.

The exemplary customer interface area 70 further includes a shelf 88. Shelf 88 provides a horizontal work surface for the customer which facilitates carrying out transactions at the customer station. Shelf 88 provides a location for the customer to hold articles as well as to sign documents or make notes. A plurality of storage locations 90 are shown positioned underneath shelf 88 in the customer interface area. Storage locations 90 are used in the embodiment shown for holding documents that a customer may need for carrying out a banking transaction. These include for example, deposit tickets or other form banking documents that may be used by numerous customers.

The exemplary embodiment shown further includes at least one a sensor 92 in the customer interface area 70. Sensor 92 is preferably an optical type sensor or other sensor which is operative to sense that a customer is present at the customer station 18. In the embodiment shown, sensor 92 is operatively connected to the indicator on the communication selector unit 46 at the service provider station. When a customer is detected adjacent to the customer station by the sensor 92 an indication is given to the service provider through an indicator on the selector unit 46. The sensor is also in connection with the queuing indicator 47 which indicates to the service provider on its display the customer station where the next customer to be serviced is located.

In some exemplary embodiments the sensor is operatively connected to a processor which is programmed to avoid giving a service provider a false indication of the presence of a customer ready to conduct a transaction. For example the processor may be operative to wait for a programmed period of time to assure that the sensor continues to sense the customer adjacent to the terminal before an indication of the customer being present is given to the service provider. In this way a customer who has merely stopped momentarily to look at the terminal but that does not wish to conduct a transaction is not falsely indicated as a customer that needs to be serviced. Alternatively or in addition, the processor may be programmed to avoid giving a false indication that a customer has left a customer station. For example if a customer steps away from the terminal momentarily but returns shortly thereafter into the area sensed by the sensor, an indication that the customer has left is avoided. This is accomplished in an exemplary embodiment through programmed timing functions which delay providing a signal corresponding to a customer leaving the area of the customer station in response to brief periods when the customer is not sensed by the one or more sensors. Of course these approaches are exemplary and in other embodiments other approaches may be used.

Other approaches to notifying the service provider may also be used. For example, when the customer picks up the handset which comprises the audio transmitting and receiving device 86 the service provider may be similarly provided with an indication that a customer is present at the customer station 18 and is ready to conduct a transaction. The customer may also notify the service provider by pressing the "call button" on the control panel 76 of terminal device 24. Written instructions may be provided in the customer interface area 70 to instruct the customer on what to do to contact the service provider when they are ready to begin a transaction. This may also include sending documents to the service provider in the carrier.

In some alternative embodiments provisions may be made for sensing the arrival of carriers at the service provider station. Appropriate sensors may be included in the area where the carriers arrive and the order of arrival indicated to the service provider through an output device. This may facilitate the handling of transactions by the service provider because the service provider can conduct the transaction with the customer who corresponds to the carrier that has been waiting the longest at the service provider station. Such indicators may include various appropriate indicators that would indicate to the service provider the order of carrier arrival and/or a time that a carrier has arrived or has been waiting to be taken. Appropriate arrangements of lights, indicators, numerical output displays, graphics displays, or other indicators may be used for this purpose.

In the embodiment shown, the customer station is comprised of components which include camera 84, display 80, carrier terminal device 24 and audio transmission and receiving device 86. In other embodiments customer stations which include different or additional components may be used. For example in some embodiments the customer station may include a cash dispenser. A cash dispenser may be operative to dispense cash to the customer at the customer station responsive to inputs provided by a service provider. Other devices may include a card reader device adapted to read cards that are input by a customer such as debit, credit, smart cards, RFID identification cards, or other appropriate identifying cards. RFID reading devices are shown in U.S. patent application Ser. No. 10/814,100 filed Mar. 31, 2004 and Provisional Application 60/459,791 filed Apr. 1, 2003, the disclosures of each of which are herein incorporated by reference. Other customer stations may alternatively or additionally include keyboards, keypads, function keys, biometric input devices, or other items.

In some exemplary embodiments customer stations may include a check acceptance device that is operative to accept checks from customers and to produce an image of all or a portion of a check that is input by a customer. Such a check imaging device is shown in U.S. patent application Ser. No. 09/723,304 filed Nov. 27, 2000 as well as Provisional Application 60/504,776 filed Nov. 17, 2003 and Provisional Application 60/678,916 filed May 16, 2005, the disclosures of each of which are herein incorporated by reference. Such a check imaging device may be suitable for sending to the service provider and/or to other operatively connected computers and systems, data concerning the check as well as data corresponding to images thereof. For example in some embodiments the check imaging device may be operative to receive the check, and one or more processors at the customer station are operative to store data corresponding to the check or an image thereof in a data store. The data store may thereafter be selectively accessed by the service provider and displayed on a screen or otherwise analyzed. In addition the check image data may be sent to other systems for purposes of processing the check. Further in some embodiments the check image may be used as a substitute electronic check which can be processed in lieu of the paper check. In other embodiments other types of items can be received, imaged, or otherwise processed. Of course customer stations may include other or additional types of devices depending on the particular type of transaction environment in which the system is used.

As shown in FIGS. 2 through 7, an exemplary embodiment includes a cover 68 that is supported on a frame 94. Frame 94 is in supporting connection with wall 38. In the exemplary embodiment the frame 94 is a conventional door frame which may be used for supporting a standard personnel door thereon. Frame 94 bounds an opening generally indicated 96 in wall 38.

Frame 94 includes a first upright member 98 and a second upright member 100. Frame 94 also includes a header member 102 which extends between the upright members.

First upright member 98 has hinges 104 operatively connected thereto. Hinges 104 are operatively connected through fasteners which attach to frame 94 in the conventional hinge attaching areas of the door frame. Hinges 104 are operatively connected to cover 68. Hinges 104 enable cover 68 to be moved from a closing position to an open position.

Figure 1:
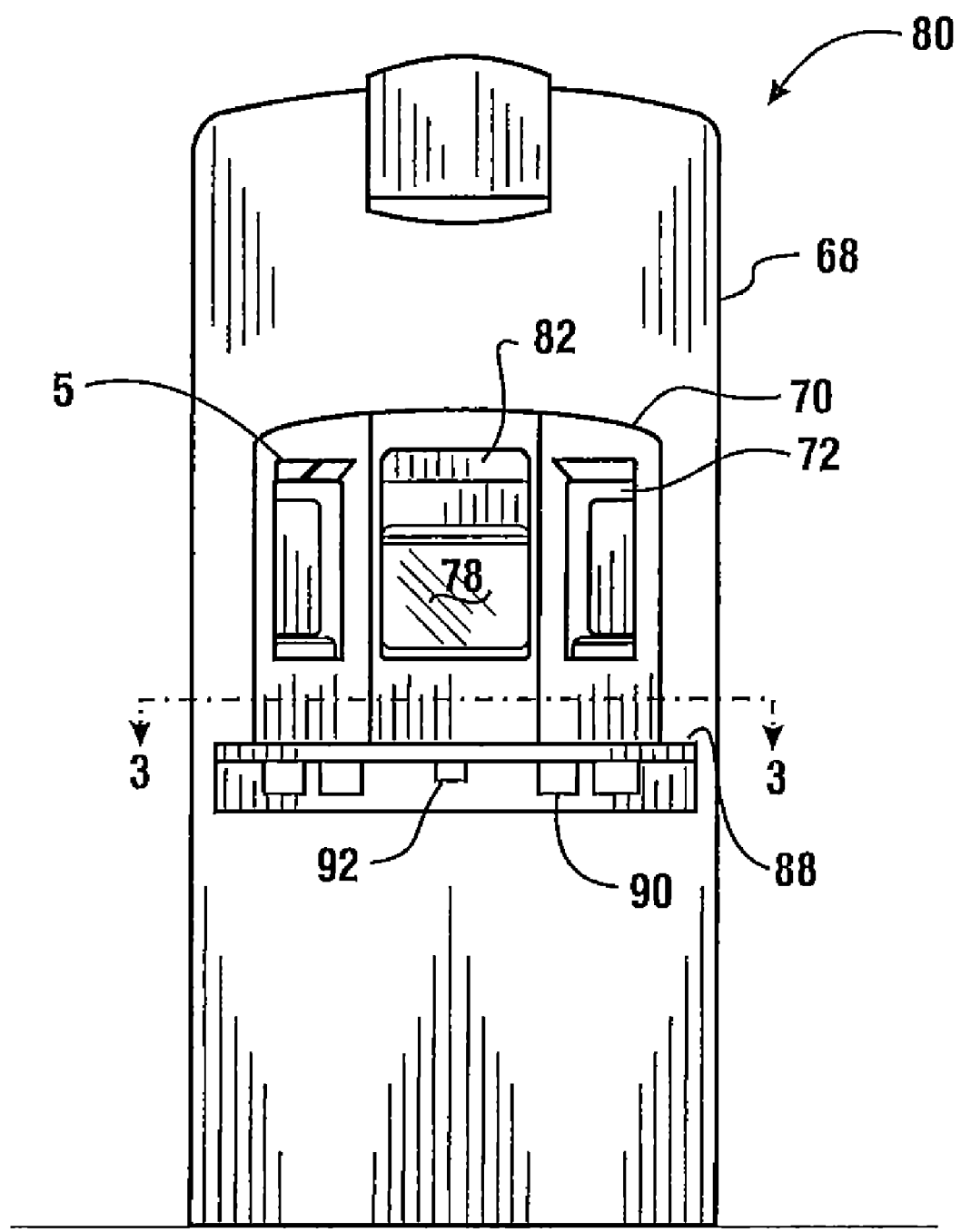
FIG. 1 is a front elevational view of a customer station of an exemplary embodiment of a system incorporating features described herein.
Figure 2:
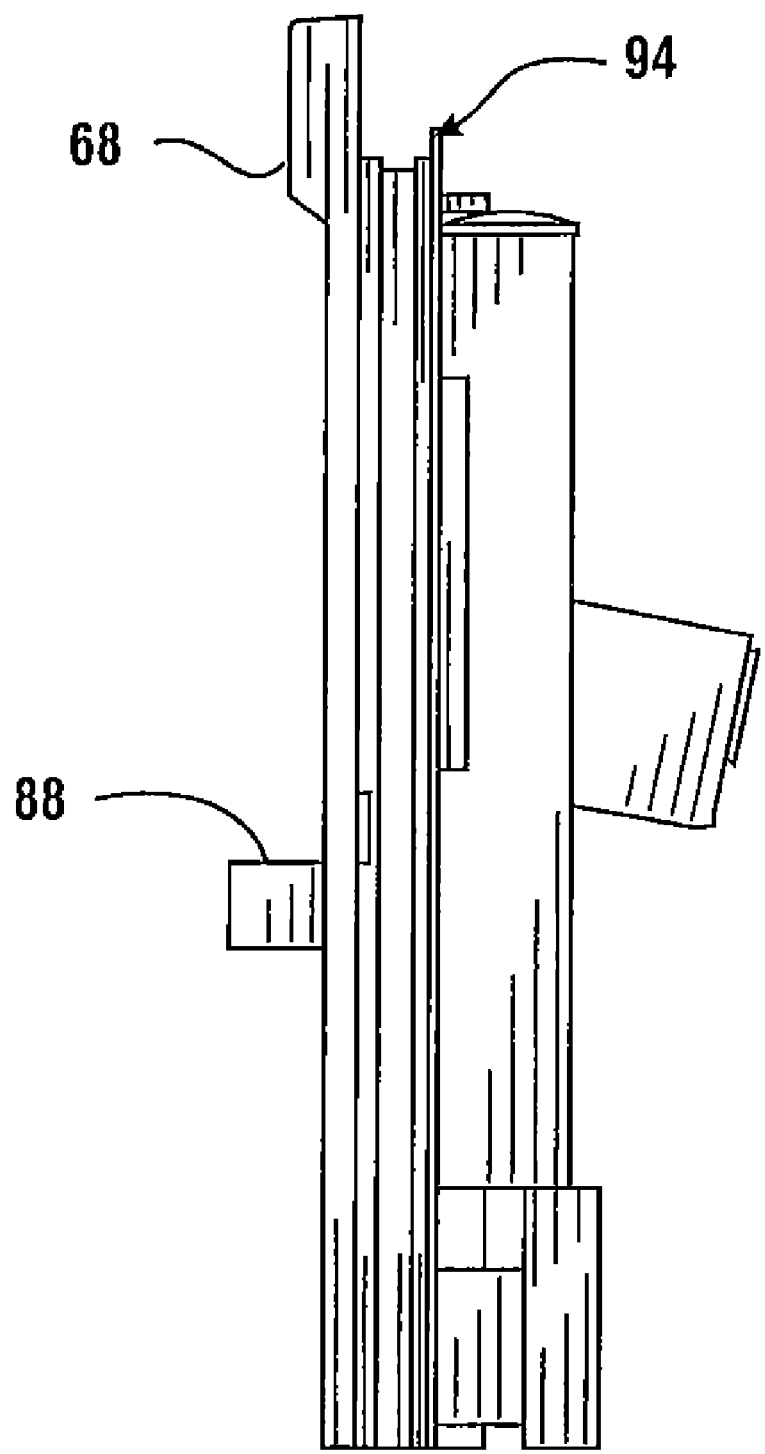
FIG. 2 is a side view of the frame and components of the customer station shown in FIG. 1.

In the closing position shown in FIGS. 1 and 2, cover 68 is in abutting relation with the wall 38 in which the frame extends. In the closing position cover 68 overlies the frame 94 and the opening 96 as well as a portion of the wall adjacent thereto.

Cover 68 is enabled to be moved by authorized personnel to rotate in connection with hinges 104. Once the cover is moved to an open position, opening 96 and the components of the customer station which are accessible through the opening may be accessed by the authorized personnel. In the exemplary embodiment of the invention, second upright member 100 includes a striker schematically indicated 106. The striker is enabled to selectively engage a locking mechanism on the cover 68. The locking mechanism is used to prevent unauthorized personnel from opening the cover.

Figure 5:
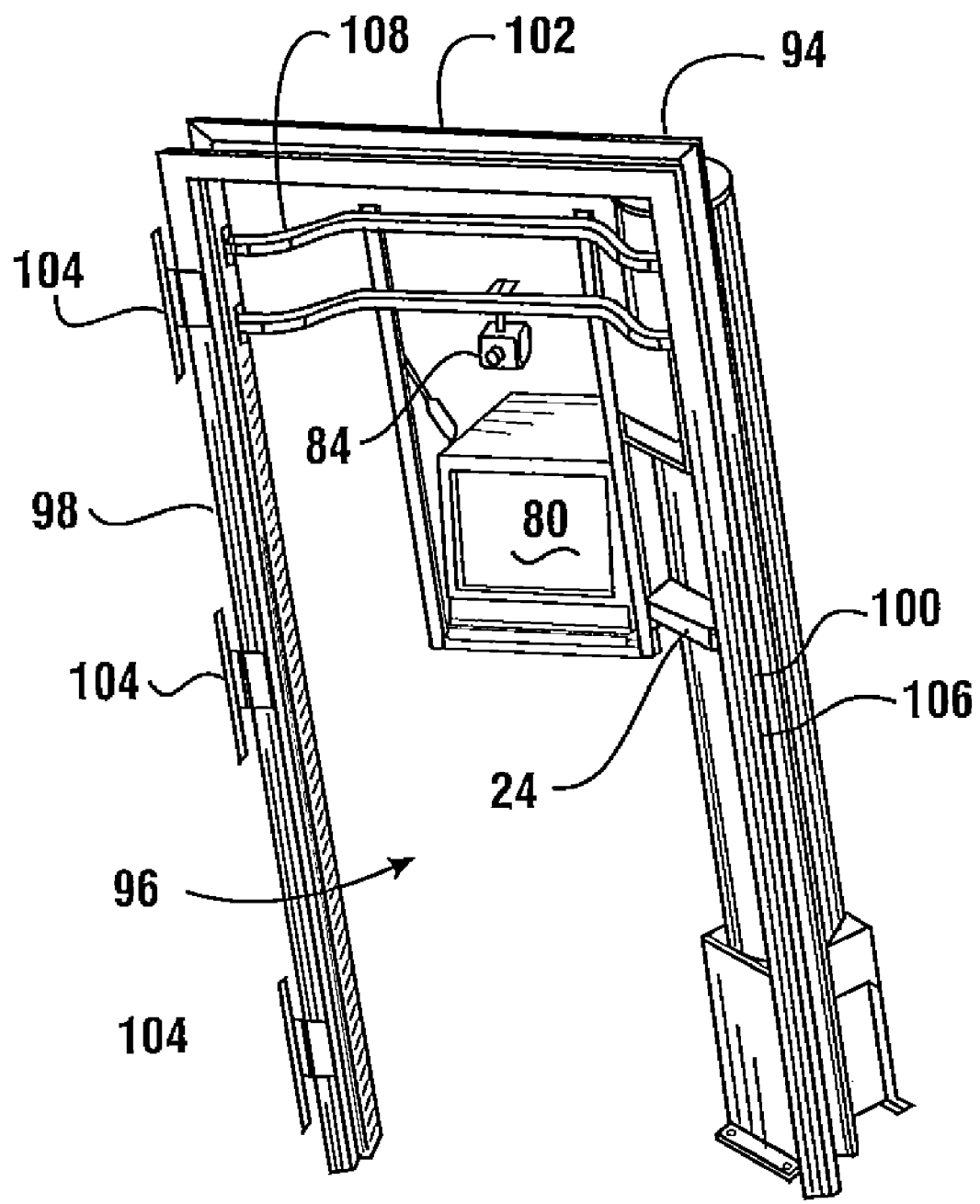
FIG. 5 is a right front perspective view of the frame and components of the customer station.
Figure 6:
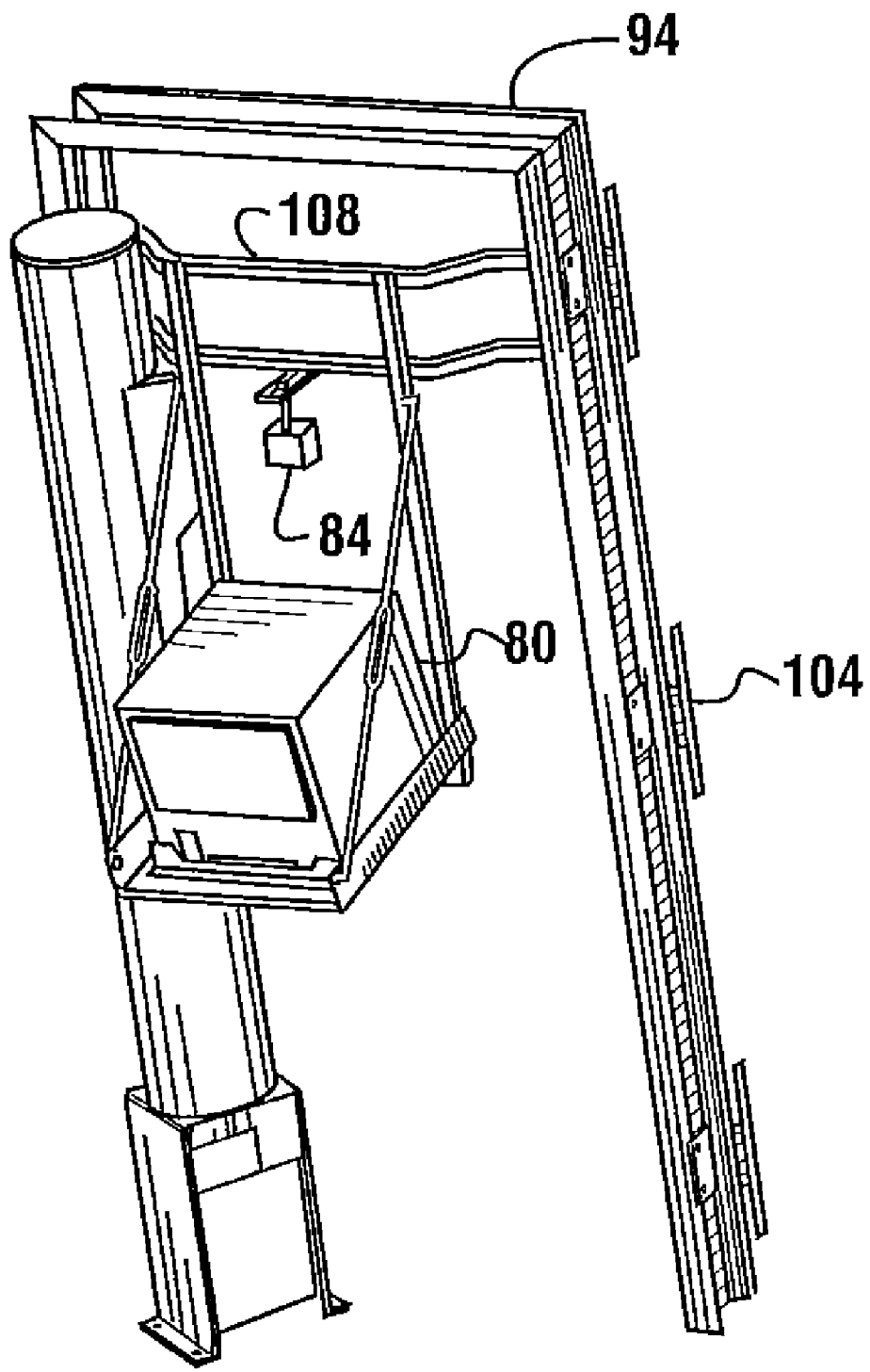
FIG. 6 is a right rear perspective view of the frame and components shown in FIG. 5.
Figure 7:
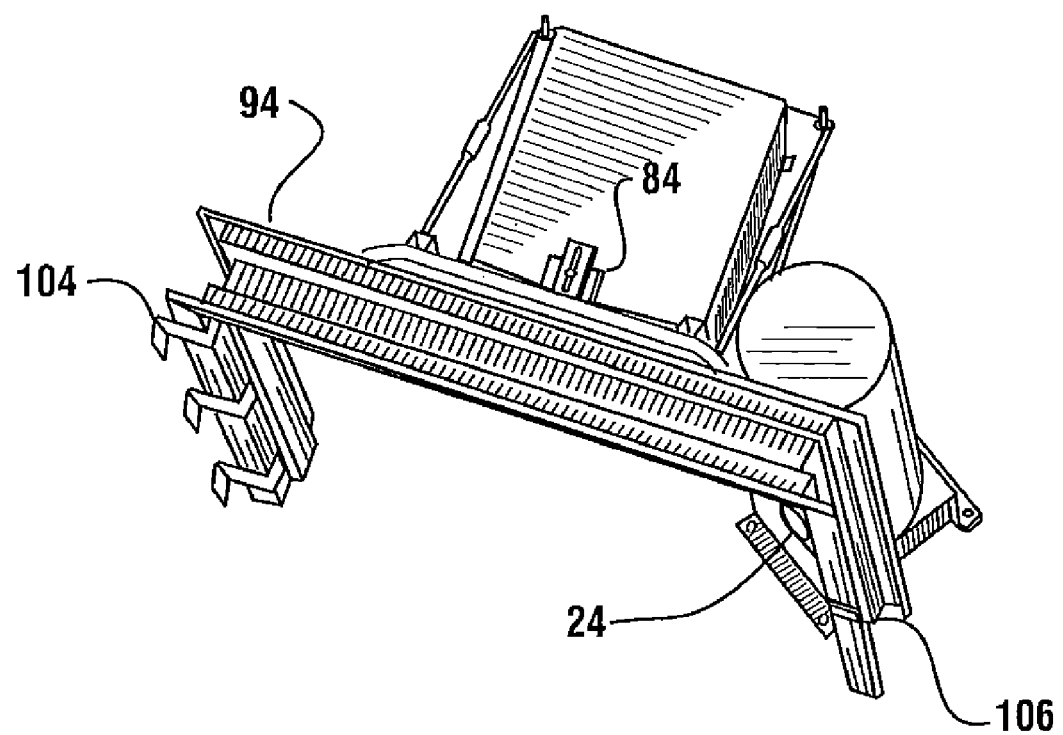
FIG. 7 is a right top perspective view of the frame and components shown in FIG. 5.

As best shown in FIGS. 5, 6 and 7, a subframe 108 is attached to upright members 98 and 100. This is done in the exemplary embodiment using conventional fasteners. This construction enables subframe 108 to be in supporting connection with wall 38. Subframe 108 supports CCTV camera 84 which is mounted thereto through an adjustable mounting bracket. Subframe 108 further is in supporting connection with visual display 80 which is also mounted in a manner which enables it to be movably positioned relative to the subframe. Subframe 108 is further in supporting connection with carrier and delivery device 24. These components of the customer station which are in supporting connection with the wall 38 through the frame 94 and subframe 108, are rendered accessible by opening cover 68 which facilitates the servicing thereof. Opening cover 68 also enables servicing components such as the handset which serves as the audio transmitting and receiving device 86, as well as the sensor 92, both of which are preferably mounted in supporting connection with the cover 68.

As can be appreciated from the foregoing description, the components of the customer station may all be accessed for servicing by opening cover 68. In the exemplary embodiment there is no requirement that rear access to the customer terminal be provided. As a result, wall 38 may be in close proximity to other objects such as a fixed wall, which enables maximizing available floor space in the customer area. In addition, cover 68 is preferably provided with mounting areas which enable it to be attached by fasteners to hinges in either a left or right hand opening configuration. This further enables optimization of available space.

A novel aspect of the exemplary embodiment is that the customer station is built around a door frame. This enables a facility to be constructed with walls having standard door openings which can be later modified to become customer stations. If an operator of a facility does not wish to have all customer stations installed initially, the frames may be fitted with conventional doors until such time as customer stations are to be installed. In addition, because customer stations of the exemplary embodiment do not require rear access, they may be installed in locations that may have been originally provided for closets or other storage. This enables ready conversion of another type facility to include the stations. Customer stations may be installed in other areas from which no rear access is provided such as in building corners. Because the carrier tubes 30 as well as the electrical wiring connections with the customer stations 18 can extend in any direction from the customer stations, either overhead or underfloor, the exemplary embodiment may be readily installed in numerous locations to facilitate the conduct of transactions.

In operation of the transaction system of the described exemplary embodiment, the displays 80 of the customer stations 18 may be used to present video material when the stations are not being operated by a customer. Data corresponding to video program material (and audio as well if desired in some embodiments) which is alternatively referred to herein as content, is stored in the data store of the computer which serves as the broadcast source, which in the described exemplary embodiment comprises video presentation device 50. The displays 80 of customer stations 18 are provided with signals corresponding to the video and/or audio material from the computer through the video switching device 48. As previously discussed, the video or audio presentation material in the video presentation device may be periodically updated on a programmed scheduled basis or on an unscheduled basis based on system inputs or other data, from a local or remote location using data transmission line 52 and communication device 54.

Figure 12:
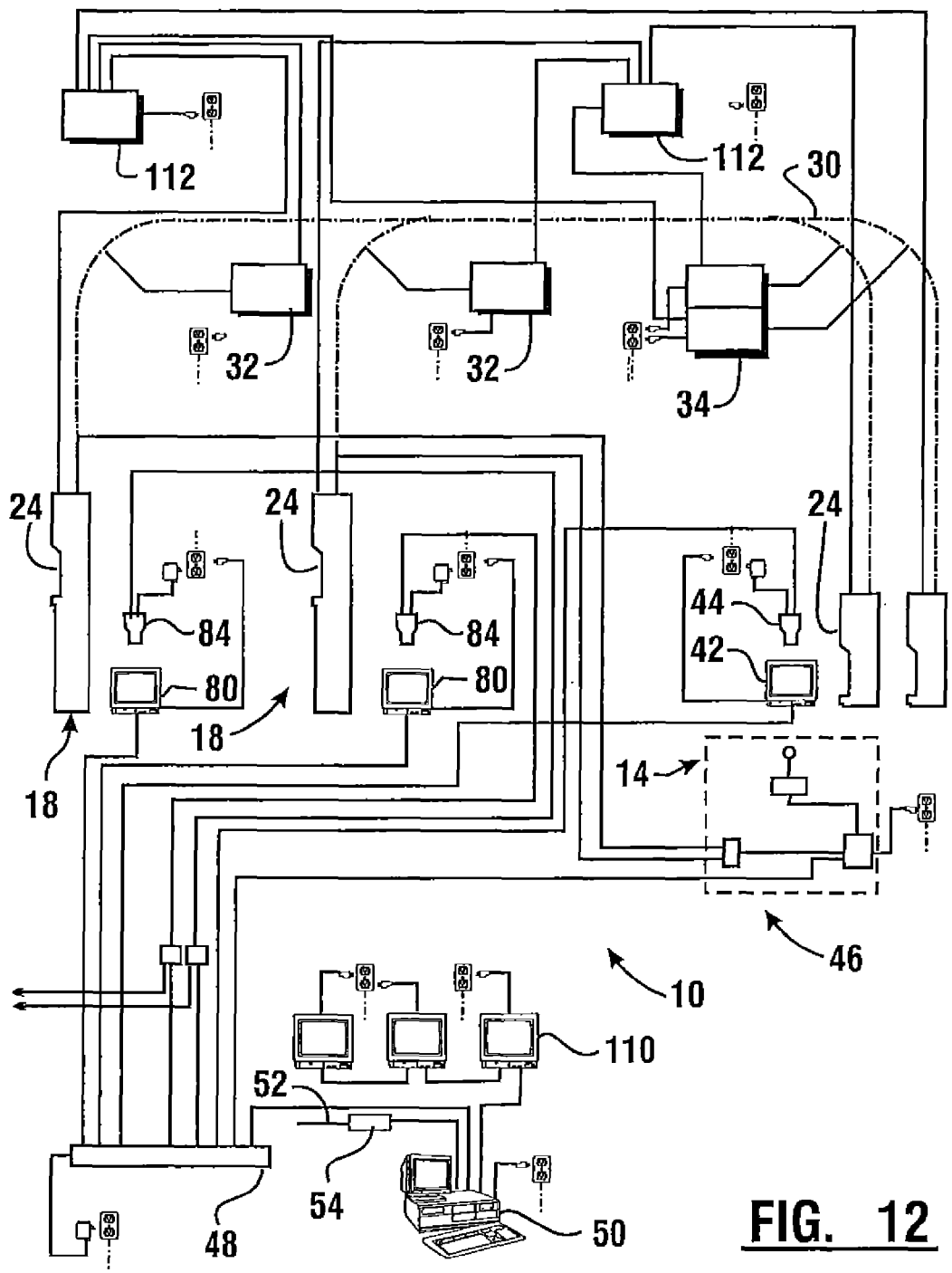
FIG. 12 is a schematic view showing the electrical and pneumatic connections between the components of the system shown in FIG. 10.

As shown in FIG. 12 in an exemplary form of the system, additional video and/or audio monitors 110 are provided to display the material from the video material presentation device. Monitors 110 may be positioned in the building 12 which houses the system either in the secure area where the service provider is located, in the customer transaction area, or both. Monitors 110 enable service providers to review the information that is being presented in the event they are questioned by a customer about it. In addition, customers who may not be interested in conducting a transaction or who have already completed a transaction may be interested in reviewing the material being presented. The installation of monitors 110 in the customer area enables customers to easily do this without occupying a customer terminal 18. Further as later discussed in detail, such monitors (alternatively referred to herein as displays) in the customer area, may have a contactless reading device associated therewith. The reading device may be used to read data which identifies the particular customer adjacent to the display. The reading device may be for example, a camera, RFID reader, biometric reader, or other type of reading device that can read data that can be used to identify the particular customer. Responsive to the data read by the reading device, at least one processor included in one or more computers operate to determine a targeted marketing presentation to output to that particular user. The at least one processor can cause the sending of signals to the display adjacent to the customer to cause the targeted marketing presentation to be output on the display adjacent to the customer. Of course, this approach is exemplary and other approaches may be used.

Continuing with the description of an exemplary transaction, a customer approaches a customer station 18 and is sensed by sensor 92. This causes an indicator to flash at the service provider's communication selector unit 46. Alternatively, a customer may pick up the handset on the customer station or press the "call button" on terminal 28 to provide a similar indication to the service provider. The signal from the customer station is also received at queuing device 47. The queuing device 47 preferably includes a timing device, such as a processor which notes a relative or real time of the customer's arrival and stores the information in a memory in connection with the processor in device 47. The queuing device preferably generates an order for servicing customers based on a time sequence in which customers arrived at the customer stations. The processor is operative to generate on the display 49 an indication of the next customer station to be serviced based on the order which includes data representative of the station where the next to arrive customer is positioned. This tells the service provider which customer should be serviced next. Of course as previously discussed in some exemplary embodiments the queuing device is operative to minimize the risk that a customer is indicated as at the customer station when the customer is only transiently present and/or minimizes the risk of indicating that the customer is no longer present if the customer leaves the area in proximity to the terminal for a short period of time.

The service provider provides an input to unit 46 to select the customer station where the customer is present. The communication controller operates in response to the input to establish two way video and audio communication with the station where the customer is present. When the service provider establishes this two-way audio and video communication the video switching device 48 operatively disconnects the display and audio output devices at the customer station from the video presentation device 50.

The queuing device 47 which is also in operative connection with the selector unit 46, deletes or otherwise changes the order data responsive to the input which places the service provider station and the customer station in communication. As a result of the modification of the order data the display 49 no longer displays the number or other designator for the customer station the service provider has now selected, and displays the designator for the customer station where the "next" customer is waiting, if another customer is present. The queuing indicator is operative not to place the customer station in the order again while the SP station is in communication with the customer station.

By communicating with the customer the service provider can answer the customer's questions and can help the customer to conduct a transaction. If the customer is not ready to proceed, the service provider may operate the communication selector unit 46 at the SP station 14 to disconnect audio and video communication with that particular customer station, and may proceed with another customer's transaction by establishing communication with another customer station. Often the customer at the first station will be instructed to insert documents into a carrier 26 and to transmit the carrier to the service provider using the carrier delivery and receiving terminal device 24 on the customer station. As a result, while the customer is getting documents ready to insert in the carrier and to transmit them in the carrier, the service provider may be conducting other transactions for other customers. The service provider will know that the customer at the customer station is ready to move forward when the carrier arrives at the service provider carrier delivery and receiving terminal device 28.

The service provider disconnects the audio and visual communication between a customer station and the service provider station through an input to selector unit, such as by pushing a button. The signals from the service provider's selector unit 46 are transmitted to the communication controller which operates the video switching device 48. Video switching device 48 of this exemplary embodiment operatively reconnects the display 80 on the customer station with the video material presentation device 50. As a result the promotional or other material stored therein will be presented to the customer during portions of the transaction.

In certain embodiments the computer or other apparatus which serves as the video material presentation device may run in a single output mode continuously, sending the same information simultaneously to all the customer stations. However, in alternative embodiments, multiple output channels may be provided so special material may be presented while the customer is conducting a transaction. These special presentations may be specifically tailored to matters which are expected to be of interest to a customer. The computer may be programmed to provide multiple output channels which are controlled through the communication controller so that the presentation to the customer picks up at the point the presentation was interrupted by the service provider connecting the audio and visual link between the service provider station and the customer station. This increases the probability that the customer will view the entire presentation. Of course, in other embodiments other arrangements may be used such as providing a "transaction in progress" screen at the customer terminal while the customer is waiting for a response from the service provider, or connecting the signal from the camera 84 at the customer station to the display 80 at the same station so that the customer sees himself or herself (as well as perhaps a portion of the area behind them) while a transaction is in progress. These and other options can be achieved by those skilled in the art based on the disclosure herein through the programming of the video switching device 48 and video material presentation device 50, and of course are merely exemplary of approaches that may be used.

The transmission of carrier 26 through the carrier tube 30 is achieved by differences in air pressure produced by blowers 32 and 34 which are connected at the ends of each tube. The blowers are controlled by the customer at the customer terminal and the service provider at the service provider terminal by inputs such as actuating the buttons on the control panels 76 and 40 respectively. These control panels are connected to blower controllers 112 which cause the blowers to operate in the manner desired to move the carrier between the customer and service provider terminals.

Transactions carried on using the exemplary system may include the transmission of documents or other items between the customers and service providers using the carriers 26. Transactions may also include the exchange of information between the customers and the service providers. This may enable the service provider to instruct the customer on how to operate other devices or otherwise obtain what is required on a self service basis. In addition, the direct communication that is available between the customer and the service provider enables the service provider to verify customer information or identification by directly viewing the customer. The system is particularly useful for providing services to individuals having disabilities who may need assistance or other information.

The method for audio communication in this exemplary embodiment of the customer station 18 which includes external microphone and speakers with an optional handset provides enhanced security for audio communications that are exchanged between customers and service providers. The semicircular configuration of the customer interface area 70 of the described embodiment limits the ability of nearby customers to observe activities that are being conducted at a terminal. This enables the spacing of customer terminals of the preferred embodiment to be in close proximity while minimizing the concern that confidential information may be intercepted.

When a customer has finished a transaction he/she may remain at the customer station for a time to review or put away items. The queuing indicator 47 preferably has its associated processor programmed to require sensor 92 at the customer station to clear and no longer sense a customer and then subsequently sense another customer before again including in the order data representing that a new customer is present at the customer station. The programming of the processor in the queuing device may require the sensing condition to exist for a period of time after the customer station senses a new customer, before the customer station is again added into the service order generated by the queuing device. This increases the reliability of the queuing indicator.

The system of some exemplary embodiments in addition to providing flexibility for a wide variety of customer transactions, also provides enhanced security for the service provider. Because the service provider is located in a secure area of the building or otherwise away from customers, service providers are less susceptible to robbery or physical harm. This can be very important where transactions involving significant amounts of cash are involved, such as in gaming or banking establishments.

An exemplary embodiment which includes the video and/or audio presentation device 50 enables the presentation of promotional material to the customers. Providing additional information often serves to increase customer satisfaction and can also result in increasing the number of transactions carried out. Such a system may further provide customers with directions on how to operate the customer stations or with other activities which are carried out in the facility. Alternatively, device 50 may transmit real time signals from another source. This may be particularly desirable in gaming establishments.

Alternative embodiments of the system may include features that enable customers to selectively access information. For example, displays 110 in the customer area may be provided with customer input devices such as a touch screen interface. Such an interface may be operated in conjunction with the content presentation device 50 or other device for delivering visual or audio content so as to enable the customer to access specific types of information that are of interest to the customer. The customer may do this by selecting items of information that are presented on a touch screen. Alternatively, or in addition, touch screen interfaces may be provided at the customer stations 18 if it is desired to enable customers to access information in that manner. However, in systems where high speed processing of transactions is desired, it may often be advantageous to limit customer inquiries to separate terminal stations or separate displays in waiting areas or common areas of a facility at which a customer's inquiry will not impede the conduct of other transactions.

Additional alternative embodiments may include having the service provider station in operative connection with an automated transaction machine station. The automated transaction machine station may include an automated transaction machine. The automated transaction machine may carry out transactions of value. The machine may have the capability of dispensing items of value. Such items may include tickets, travelers checks, coupons, scrip, wagering slips, stamps, currency, vouchers, fuel, oil, food, groceries, or other items of value. The automated transaction machine may comprise a self-service dispensing machine, including vending machines and motor fuel dispensing pumps.

The automated transaction machine may comprise an automated banking machine. The automated banking machine may operate to dispense currency, e.g., permit cash withdrawals. The automated banking machine may accept deposits in the form of cash, checks, envelopes, or other items. The automated banking machine may be used for providing credit, making bill payments, transfer funds between accounts, print statements, or to debit or deposit funds in various accounts. The automated transaction machine may comprise an ATM at an ATM station. The ATM may include for example features described in U.S. Pat. Nos. 6,010,065; 6,273,413; 6,505,717; 6,573,983; and/or 6,839,688, the disclosures of each of which are herein incorporated by reference. For purposes of this disclosure an ATM automated banking machine or automated transaction machine shall include any machine that operates to carry out automated transactions including transfers of value.

The service provider station may be connected to the machine in a manner that enables the service provider to provide assistance to a customer to conduct a transaction. Thus, a service provider station could be operatively connected to at least one customer station and at least one automated transaction machine. The arrangement enables a service provider to assist automated transaction machine customers, such as ATM customers, especially when customer stations are not being fully utilized.

Furthermore, in some embodiments plural service provider stations can be arranged in an overlapping manner to service a combination of plural customer station customers and plural ATM customers. Each service provider station could be in operative connection with each customer station and each ATM station. The use of plural service provider stations ensures that a single service provider is not burdened with a much greater share of the workload, and improves servicing efficiency.

The service provider station could be connected to the ATM station in a manner similar to previously discussed connection arrangements between a service provider station and a customer station. The pneumatic tube features can in some cases not be provided or may be provided in an adjacent device. The service provider station and the ATM may be housed inside of the same building. Alternatively, the ATM may be located outside of the building in which its corresponding service provider station is housed. Thus, an ATM may be disposed from or remotely located from its service provider station.

Of course it should be recognized that there may be a pneumatic tube type of arrangement between a service provider station and an ATM station when the stations are in relatively close proximity. The service provider may be able to better assist an ATM customer by providing information or other items via the pneumatic tube system. The service provider may also be able to assist an ATM customer with transactions that are not feasible at the ATM machine. The ATM station may also be used as (or converted to) an additional customer station when the ATM is no longer operable to conduct a desired transaction.

A service provider (SP) station and an ATM station may be arranged in a manner that provides visual (e.g., video) and audio communication between a service provider and at least one ATM customer. The visual and audio communication arrangements may be similar to those previously discussed with regard to previous embodiments relating to an SP station and one or more customer stations. For example, a service provider station may include one or more visual displays, similar to previously discussed display 42. The service provider station may also include one or more cameras, similar to previously discussed camera 44. A camera may be positioned adjacent to a visual display so that when the service provider views an ATM customer on the service provider display, the camera provides an image of the service provider on an ATM visual display. The service provider camera may be arranged so that the service provider appears to be looking at the customer.

SP station may further include a communication selector unit. The communication selector unit and its operation may be similar to previously discussed communication selector unit 46. The communication selector unit may include an audio transmission and receiving device, such as a microphone and a speaker. The communication selector unit may further include selector buttons or other input means by which the service provider may selectively actuate to establish video and audio connections between the SP station and a selected ATM. The video/audio communication selector unit may also include an indicator, such as a light, which is used to indicate to a service provider that a customer is present at a particular ATM. Of course it should be understood that the system arrangement may be modified to fit the particular transaction environment in which it is to be used.

The ATM station may include visual and audio transmission and receiving devices. The ATM station may have components similar to a customer station. The ATM may include a visual display, camera, audio transmitting device, and audio receiving device enabling visual and audio communication between a customer at the automated transaction machine station and a service provider at the SP station. For example, the ATM station may include a visual display device, camera system, microphone arrangement, and one or more speakers.

The ATM display may include a display screen which is alternatively referred to herein as an ATM display. The display screen may be able to simultaneously display information relating to the transaction and a live image of the service provider. For example, the service provider may be displayed in a small area in a corner of the screen. The service provider image may appear as overlying the transaction information. The service provider's image may be shown in a manner similar to a picture in a picture type of arrangement. The ATM customer may have the option of moving the service provider image to a desired position on the screen and/or changing the size of the image. The ATM customer may further have the option of not viewing or showing the service provider.

The image portion of the customer screen may also show pre-recorded images or instructions to assist the customer with specific questions. The instructions presented could be determined by a computer after analyzing the customer's question. The instructions presented may be chosen by the computer based on key words spoken by the customer. Furthermore, the service provider may have the option of presenting pre-recorded images or instructions after hearing the customer's question. A service provider may choose to use pre-recorded presentations when busy with other customers or when the ATM customer's question is basic and can be answered electronically. This may be done by providing appropriate inputs through input devices of the service provider station. Similar presentations may be in different formats, e.g., an animation or sports format. The presentations may provide examples of how to conduct a transaction with the particular ATM machine. The presentations may use the entire display screen area.

The presentations may also be linked to an actual transaction. For example, a computer could follow the actual transaction procedure and present information to the customer to assist the customer in completing the desired transaction. The information could be presented in a portion such as a corner of the display screen so as not to interfere with the customer viewing the actual transaction screen.

Advertisements could also be presented to a customer. The advertisements may be based on a variety of factors, such as customer identity, customer demographics, types of accounts, account balances, etc.

The visual and audio transmission between an SP station and an ATM station may involve any of telephone lines, an intranet, the Internet, satellites, wireless communication such as radio frequency communications, or other communication methods.

The operative connection between an SP station and an ATM station may in some embodiments be arranged so as to permit the service provider to view the same transaction information as the customer. For example, the service provider may view the same transaction screen as the customer. The service provider may also have the option of viewing the customer image along with the customer transaction screen. The service provider may further have the option of not viewing the customer. The ATM station may have plural cameras for providing the service provider different fields of view. The camera(s) may be positioned to capture images of a customer of the machine as well as persons who may be adjacent to the machine.

With the customer and the service provider viewing essentially the same screen then better service or help can be provided. For example, the service provider may instruct the customer which button(s) or key(s) to push in achieving a desired transaction. The service provider is able to walk a customer through an entire transaction.

The communication arrangement link between the SP station and the ATM station permits the service provider to highlight or point to specific locations on the ATM screen. For example, the service provider may use a type of teleprompter which enables the ATM customer to view an arrow on the ATM screen. The service provider station may include input devices such as a touch pad, touch screen and mouse that enable the service provider to move indicators such as a pointer, highlighter or other item or icons on the display screen of the customer station. In this way a service provider is enabled to indicate to the customer particular features or items as appropriate in connection with the display being output. This may include for example directing the customer to appropriate function keys adjacent to the display, icons located on the screen or other appropriate items associated with the presentation being made to the customer. This arrangement may better assist customers in understanding exactly which button or key to operate, or which section of the screen to touch if the screen is a touch screen.

The ATM may also include a key or feature that a customer can operate to call the service provider at the service provider station. For example, an ATM customer may press a "call button" to activate communication with a service provider.

The SP station may be also be operable to receive one-way visual and audio communication from the ATM station. A timer may be used in notifying a service provider that a customer has been operating an ATM for an abnormal period of time. The service provider can then investigate the ATM to determine whether the customer needs assistance. For example, once notified by a sensor or indicator, the service provider may be granted video and audio capabilities (which the customer may not be granted) to ascertain the situation at the ATM. Other SP station arrangements may permit the service provider full time unlimited video and audio capabilities, including viewing the customer image along with the customer transaction screen.

The SP station and ATM station communications may in some embodiments also include translation capabilities. A translator may comprise computer software which enables real time translation. The customer may indicate which language is desired by pressing an appropriate ATM button after viewing an initial screen presentation. The ATM could then present all transaction information to the customer in the requested language. A real time translator can be used for audio communication with the service provider. For example, the translator could permit an English speaking service provider to audibly (or via text) communicate with a French or Spanish speaking customer.

Automated transaction machine stations may also be operatively connected with the queuing device at the SP station. Therefore, each of the customer stations and ATMs assigned to a service provider station may be linked to a common queuing device. Thus, a service provider can service the stations in proper order.

In some exemplary embodiments service providers may be enabled to operate transaction function devices at the customer station. This may include for example operating a cash dispenser in response to inputs to input devices at the service provider station. For example in some embodiments a customer may wish to cash a check that is presented at the customer station. The service provider may be enabled to access image data related to the check which is imaged by the check accepting device. In addition the service provider is enabled to obtain information from the customer. This may include identifying information such as a driver's license, a pay stub or other information. If the service provider is satisfied that the check is valid and will be paid, the service provider may cause the cash dispenser to operate so as to provide the customer with funds. Of course this approach is exemplary and there are many different types of transactions that could be carried out with embodiments of the system. Further embodiments may include the capabilities for documenting transaction activities which are conducted by customers, service providers or both. This may be accomplished by features described in U.S. patent application Ser. No. 09/991,478 filed Nov. 23, 2001, the disclosure of which is herein incorporated by reference. Of course this is exemplary of many features and approaches that may be used.

It should further be understood that although in the exemplary embodiment the pneumatic tube conveyor and cash dispenser comprise item delivery devices which deliver items to customers at the customer station, in other embodiments other types of item delivery devices may be used. Such item delivery devices may include devices that deliver items that are moved from the service provider to the customer. Item delivery devices may also include devices that deliver items from storage at the customer station to the customer. Further other alternative item delivery devices may include items that produce the item in whole and in part at the customer station. These may include for example a money order printer, or a device that produces a card with data representative of value stored thereon. Of course these approaches are exemplary and in other embodiments other approaches may be used.

Figure 13:
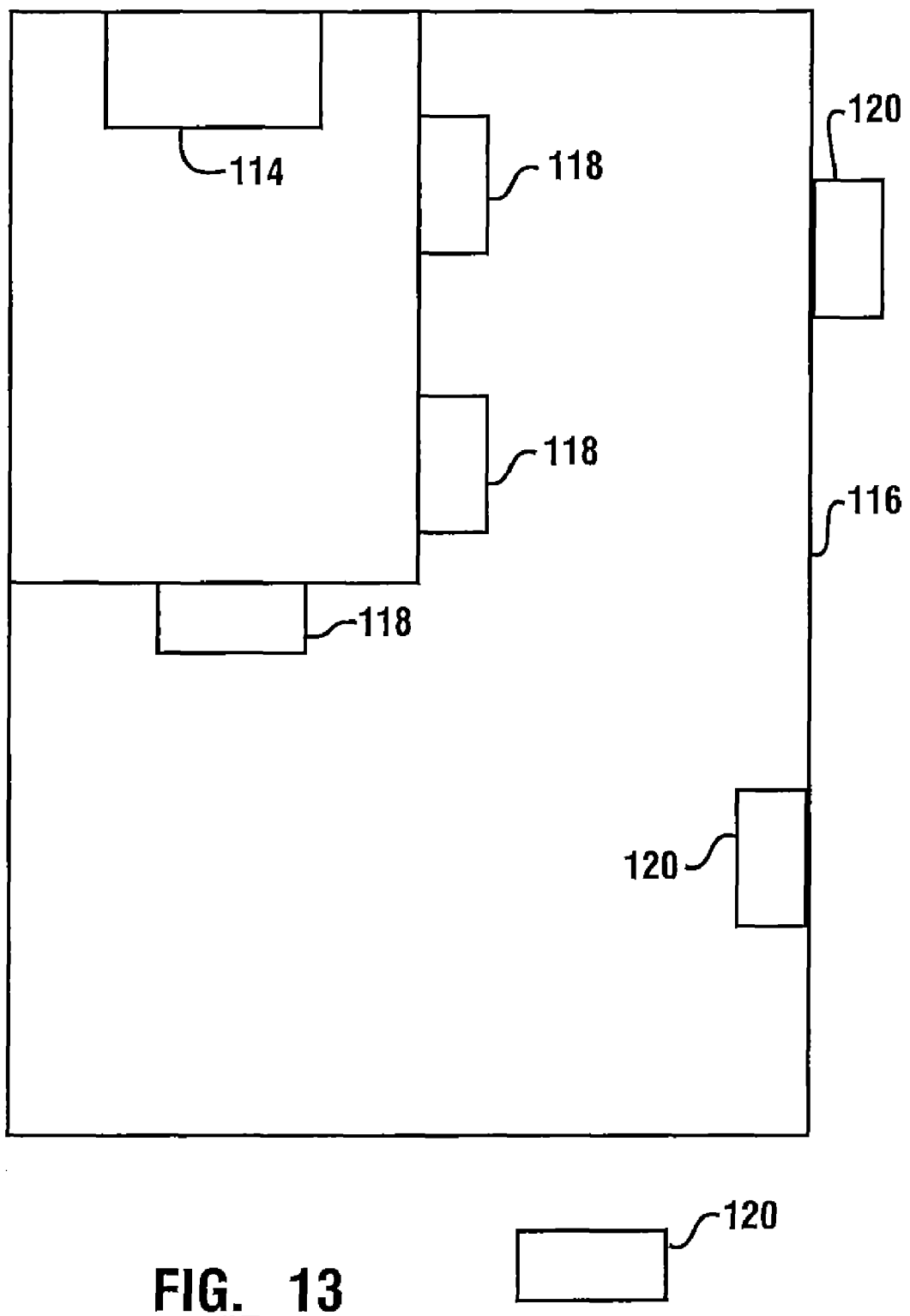
FIG. 13 is a view of a service provider station and customer stations and ATM stations used in an exemplary embodiment of a transaction system.

FIG. 13 shows a transaction system including an SP station 114, customer stations 118, ATM stations 120, and a building 116. The SP station 114 is operative to communicate with the customer stations 118 and the ATMs 120. As previously discussed, items may be exchanged between the service provider station and the customer stations, such as through a conveyor such as pneumatic tube system. Again, the SP station 114 and customer stations 118 may be positioned in the building 116, with the SP station in a secure room in the building. As previously discussed, an ATM station may be located inside or outside of the building in which the SP station is housed.

Figure 14:
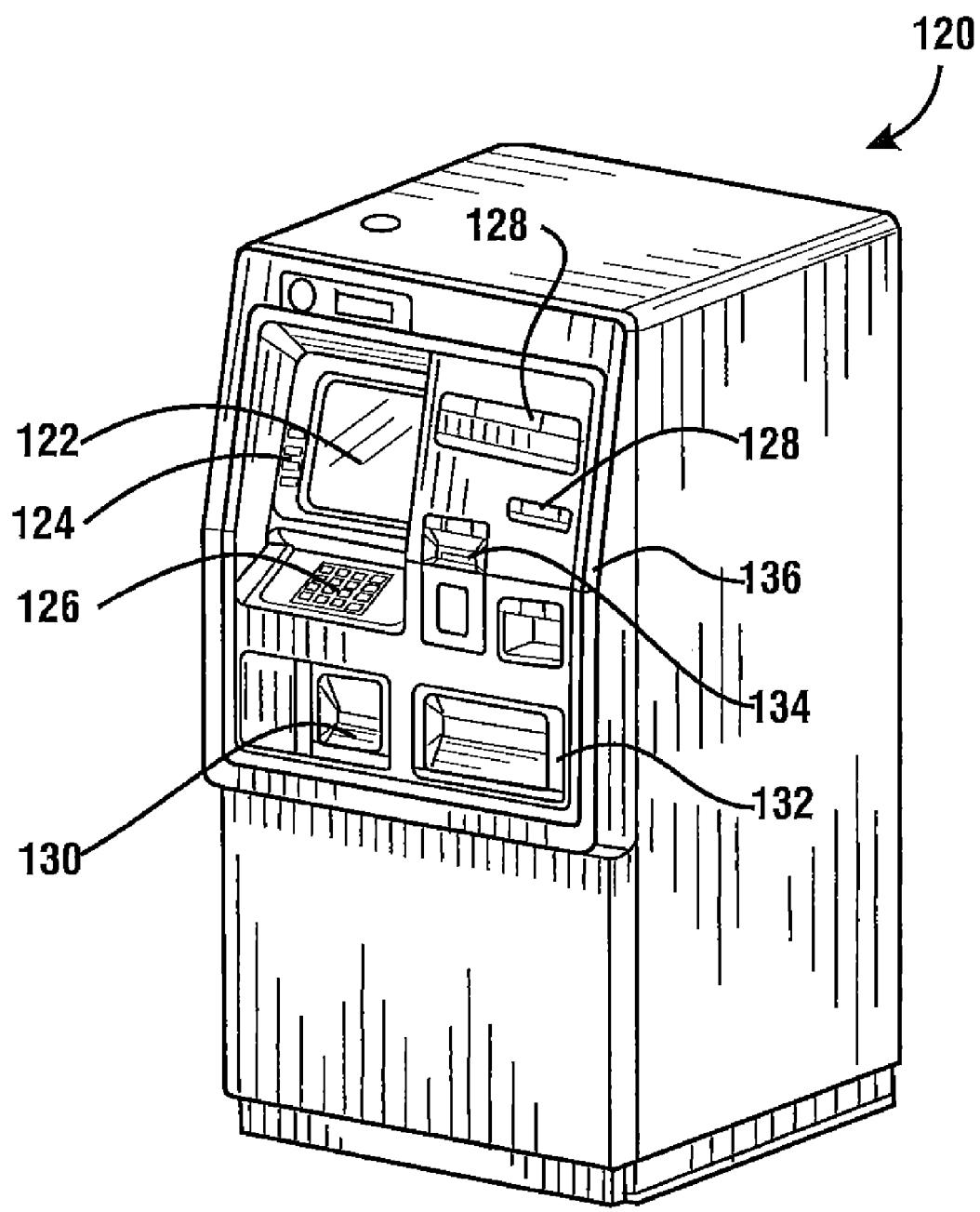
FIG. 14 is a view of an ATM station which may be used in the exemplary system shown in FIG. 13.

FIG. 14 shows an exemplary ATM station 120 which may be used in operative connection with an SP station, such as the SP station 114 of FIG. 13. The ATM station may include a plurality of transaction function devices. The devices may include for example, a display screen 122, function keys 124, keyboard 126, statement outlet opening 128, depository opening 130, currency outlet opening 132, card reader/writer entry slot 134, receipt opening 136, and camera opening 138.

The ATM at the ATM station is operative to dispense currency such as bank notes. The ATM may also include a depository for accepting deposits through the depository opening into a secure location in the machine. A receipt printer may also be included for providing transaction receipts to customers through the receipt opening. The statement outlet opening may be used for delivering sheets which comprise account statements to users of the machine. The camera opening provides a field of view external of the machine for a camera mounted within the interior of the ATM enclosure. A journal printer may also be included for keeping a hard copy record of transaction information. In other embodiments other or additional transaction function devices which carry out other transaction functions may be used. Other embodiments may include fewer transaction function devices. It should be further understood that while the described embodiment is an automated banking machine, the principles of the invention may be employed in many types of transaction machines that do not necessarily carry out banking transactions.

In some alternative embodiments a transaction system is provided which has the capability of placing a customer at the customer station in connection with a service provider located remotely relative to the transaction facility. Such a service provider may include for example, a person who is a specialist in the particular type of transaction that the customer wishes to conduct. In alternative embodiments the remote service provider may be a service provider who has greater authority than the local service provider who has been dealing with the customer. For example, the remote service provider may be a management level person who could offer the customer a refund or other benefit that the local service provider has no authority to grant. In still other situations the remote service provider may be a service provider related to a different entity than the entity that operates the transaction facility. Such a remote service provider may be able to offer ancillary services, but which pertain to the customer's needs. Various types of remote service providers may be operatively connected to the system depending on a particular type transaction environment.

In exemplary embodiments a remote service provider located at a remote service provider station may be placed in operative communication with the customer at the transaction station to carry out at least a portion of a transaction. In exemplary embodiments the remote service provider station may be connected through suitable communications devices to the transaction facility in a way that enables the remote service provider to be in video and audio communication with the customer at the customer station. Such communication may be accomplished in response to inputs to input devices provided by the local service provider, the customer or automatically responsive to operation of an ATM or other transaction function device.

The exemplary remote service provider station in addition to including the camera, video display, audio transmitting device and audio receiving device may be in operative connection with one or more input devices that enable the remote service provider to provide inputs that control outputs and/or transaction function devices at the customer station. This capability may include for example the remote service provider being able to perform functions of the local service provider as previously discussed. In addition the remote service provider may be enabled to access other systems or initiate other types of activities such as financial transactions, which are operative to transfer funds to or from a customer or a customer account. Remote service providers may be able to control outputs through the visual display and/or output devices of the customer station such as by providing inputs that cause prerecorded presentations to be output. Likewise remote service providers may be enabled to provide inputs that manipulate a pointer, provide highlighting or achieve other outputs at the customer station. Alternatively or in addition the remote service provider may be able to provide inputs that cause the visual display or audio transmitting device such as the speaker of the customer terminal, to be connected to the broadcast source. Alternatively or in addition remote service providers may be able to access data input by a customer through an input device such as a card reader, keyboard, biometric reader, camera, or other device at the customer station, and may control transaction function devices such as cash dispensers, check imagers, or other devices that can be operated at the customer station or in the vicinity of the customer station. Of course these features are exemplary and in other embodiments other approaches may be used.

Figure 15:
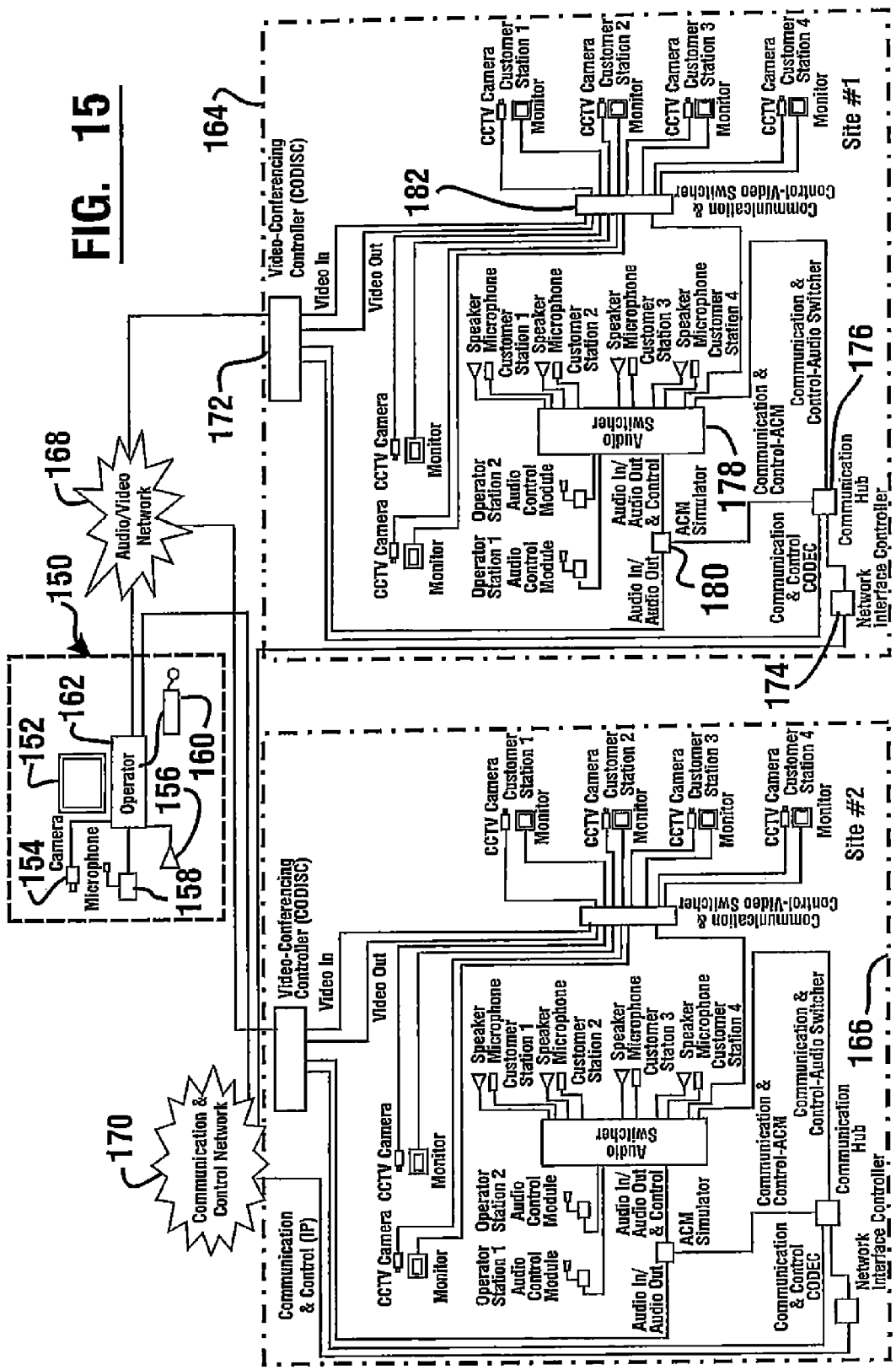
FIG. 15 is a schematic view of an exemplary system for communicating between customer stations, a local service provider station and a remote service provider station.

FIG. 15 shows a schematic view of a transaction system which shows a remote service provider station generally indicated 150. The remote SP station 150 includes a visual display 152, camera 154, speaker 156 which serves as an audio transmitting device and microphone 158 which serves as an audio receiving device. Exemplary remote SP station 150 also includes input devices which in the exemplary embodiment include a keyboard and mouse which are operatively connected to a computer 162. Of course these components are exemplary and in other embodiments other or additional components may be used.

Remote SP station 150 is in electronic communication with the transaction facility that houses the local SP stations and customer stations. In the exemplary embodiment the remote SP station is shown in connection with two transaction facilities 164 and 166. Of course it should be understood that the remote SP station may be in operative communication with lesser or greater numbers of remote transaction facilities.

The remote SP station is shown in operative communication with the transaction facilities through network connections. As schematically indicated the network connections are operative to provide audiovisual communication through an audio/video network 168. The remote SP station is also operative to communicate with the transaction facilities through a communication and control network 170. It should be understood however that although networks 168 and 170 are shown as separate networks, in some embodiments they may constitute different communication links through a common network such as the Internet.

As in the described embodiment shown schematically in FIG. 15, transaction facilities 164 and 166 are similar, only transaction facility 164 will be described. The remote SP station is in operative communication with the devices of the transaction facility through one or more controllers. The controllers are operative to manage, switch and otherwise manipulate signals that enable operative connection with the remote SP station. In the exemplary embodiment the audio/video network 168 communicates audio and visual signals through a controller 172. Controller 172 provides compression and decompression functionality. Thus the controller 172 serves as a compression decompression device that receives audiovisual signals from the cameras and speakers of the customer stations and/or local service provider stations, and compresses them for purposes of transmitting the signals through the network 168. When such signals are received at the remote SP station the computer 162 includes suitable software for decompressing the signals so as to provide suitable audio and visual outputs to the remote service provider. Likewise when the remote service provider at the remote SP station 150 sends video and audio signals, the computer 162 is operative to compress them before transmitting them through the network 168. The compression decompression device included in the controller 172 is operative to decompress the signals so as to be suitable to produce output through the speakers and displays of the customer stations and/or local service provider stations. Of course these approaches are exemplary.

In the exemplary embodiment the communication and control network 170 is operatively connected to a network interface controller 174. Network interface controller is operative to provide control and other communications with the remote SP station. In addition the exemplary network interface controller has stored in association therewith the addresses for the various nodes on the network such as devices accessible through the transaction facility. Thus the network interface controller 174 of the exemplary embodiment is operative to cause the proper connections and communications to be made.

The network interface controller 174 as well as the controller 172 are in operative connection with a controller 176 which serves as a communications hub. The communications hub serves as an interface to devices at the remote SP station. The communications hub receives data from the customer station devices and determines the action to take with regard to the data based on its programming. The exemplary communications hub formats the data for transmission to the network interface controller or other device to which is it conveyed at the remote SP station. The exemplary communications hub is also operative to determine and route incoming audiovisual signals to the appropriate customer or service provider station.

In the exemplary embodiment the communications hub 176 is in operative connection with a controller 178 that serves as an audio switcher. The audio switcher 178 is operative to provide connections between the audio receiving devices and audio transmitting devices at the customer stations and the local service provider stations, as well as to route the audio signals for transmission to the remote SP station. In the transaction facility shown there are four customer stations and two local service provider stations. Of course this approach is exemplary.

In the exemplary embodiment the audio switcher 178 is in operative connection with a controller 180. In the exemplary embodiment the controller 180 is programmed to act as a simulator which simulates the outputs of a local audio transmitting device and audio receiving device for purposes of delivering and receiving audio signals from the audio switcher 178. The simulator 180 is in operative connection with the communications hub 176 and the controller 172. The simulator 180 operates responsive to the network interface controller and the communications hub to provide audio communication through the controller 172 from the remote SP station to the selected customer station. This is done responsive to inputs by the remote service provider which are transmitted through the communication and control network 170. Likewise audio signals to the remote SP station is appropriately routed through the simulator 180.

In the exemplary embodiment the audio switcher 178 is in operative connection with a controller 182 which serves as a video switcher. The video switcher 182 is also in operative connection with the cameras and visual display devices at each of the customer stations and the two local service provider stations. The video switcher 182 is operative responsive to the signals received from the audio switcher to cause the appropriate video communication between the customer station, local service provider station or remote service provider station.

Thus for example in the exemplary system shown in FIG. 15, a local service provider may provide inputs so as to connect each selected customer station to be in audio and video communication with the local service provider through the local service provider station. However in cases where the customer's transaction requires assistance from a remote service provider, the local service provider and/or the customer may provide inputs which are operative to cause the interface controller and switcher to place the remote service provider station 150 in audio and video communication directly with the customer terminal. Alternatively in some embodiments provision may be made for placing the local service provider in communication with the remote service provider. Alternatively in some embodiments the customer, local service provider and remote service provider may all be in video and/or audio communication during the course of the transaction.

The local service provider, remote service provider and/or customer may provide appropriate inputs. Such inputs may be received by local service provider or corresponding data may be received by the remote service provider. The remote service provider may also access data or control devices at the customer station. Various actions may be taken as appropriate so as to carry out the transaction or portion of the transaction for the customer. Upon the completion of the transaction inputs provided by the remote service provider, local service provider and/or the customer, may cause the disconnection of communication with the remote service provider. Further as previously discussed in situations where the customer at the customer station is dealing with the remote service provider, the local service provider may be servicing other customers so as to provide increased transaction throughput. Of course these approaches are exemplary and in other embodiments other approaches may be used.

Figure 16:
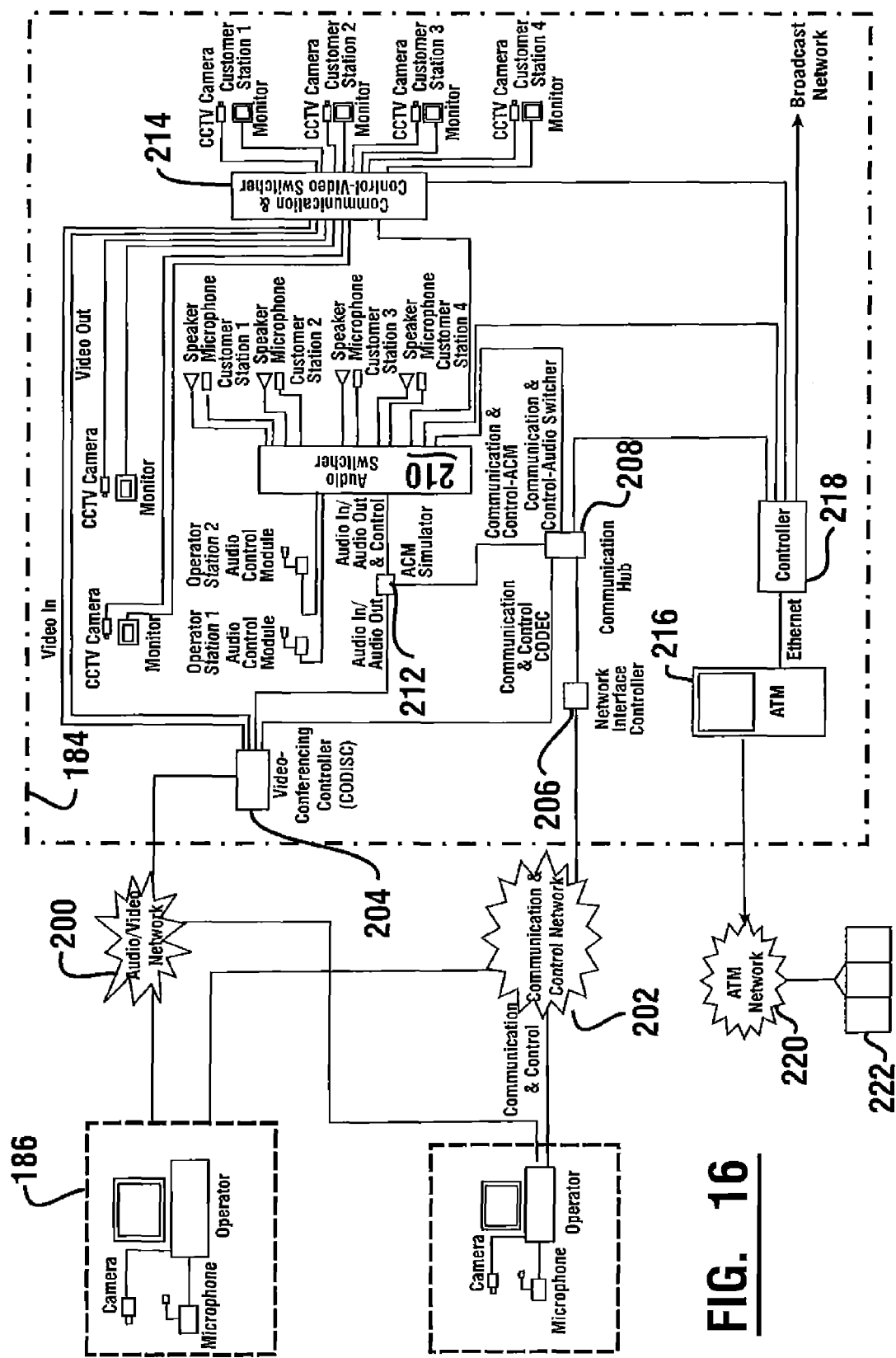
FIG. 16 is a schematic view of an alternative system in which local and remote service providers are enabled to communicate with customer stations including customer stations that incorporate an ATM.

FIG. 16 shows schematically an alternative system in which a transaction facility 184 and the customer stations therein may be connected to multiple remote service provider stations 186, 188. In this alternative embodiment the remote SP stations may include the devices and features of remote service provider station 150 previously discussed. Also each of the remote service provider stations may communicate with the transaction facility through an audio/video network 200 and a communication and control network 202. As with the previously described system the controller 204 serves as a compression decompression device for audio and video signals. A controller 206 serves as a network interface controller to the communication and control network 202. The network interface controller 206 is connected to a controller 208 which serves as a communications hub. The communications hub 208 is connected to a controller 210 which serves as an audio switcher. The communications hub 208 is also connected to a controller 212 which serves as a simulator which is connected to the controller 204 and the audio switcher 210 and performs the functions previously discussed. Also as in the previously discussed embodiment, the audio switcher 210 is operatively connected to the video switcher 214.

In this exemplary transaction facility a customer station 216 includes an ATM. The ATM 216 is in operative connection with a controller 218 which is in operative communication with the communication hub 208. In this exemplary embodiment the ATM 216 is operatively connected to a transaction network 220. Transaction network 220 enables operative connection of the ATM 216 to remote computers schematically indicated 222 which enable the ATM to carry out ATM transactions such as the dispensing of cash, the receipt of deposits, the checking of balances and other ATM transactions in response to appropriate transaction computers 222.

In this exemplary embodiment the customer station associated with ATM 216 may include a camera, audio transmitting device, audio receiving device, visual display and input devices similar to other customer stations previously discussed. Responsive to appropriate inputs and/or responsive to programming of the controller associated with the ATM, audio/video communication may be established at the customer stations including at the ATM, with the local and remote service providers. The local and remote service providers may as appropriate engage in video communications so as to carry out transactions with the customer located at the ATM. Also in exemplary embodiments inputs from the service providers may be operative to control item delivery devices, output devices, or other devices at the ATM so as to provide the customer with items such as cash as appropriate for carrying out transactions.

Further in the exemplary embodiment the controller 218 may provide a source of audio and visual presentations. These presentations may be selected in the manner previously discussed through inputs by the service providers, and presented to a selected customer through the visual display and audio transmitting device of the customer station which includes the ATM. Alternatively or in addition, the controller 218 may serve as a local broadcast source of material. Responsive to inputs from the service providers, or the programming of the ATM, the output audio and/or visual devices of the ATM may be connected to the broadcast source. Further as schematically indicated in FIG. 16, controller 218 may provide an interface to a remote broadcast source so as to provide outputs to the customer stations.

In the exemplary system schematically represented in FIG. 16, selected remote service providers who may have different capabilities or expertise may communicate with customers at customer stations including at the ATM. Such remote service providers may also communicate with local service providers so as to facilitate the carrying out of transactions. In addition or in the alternative, the remote service providers may control devices at the customer stations so as to deliver items, provide presentations or carry out other activities related to performing transactions.

Figure 17:
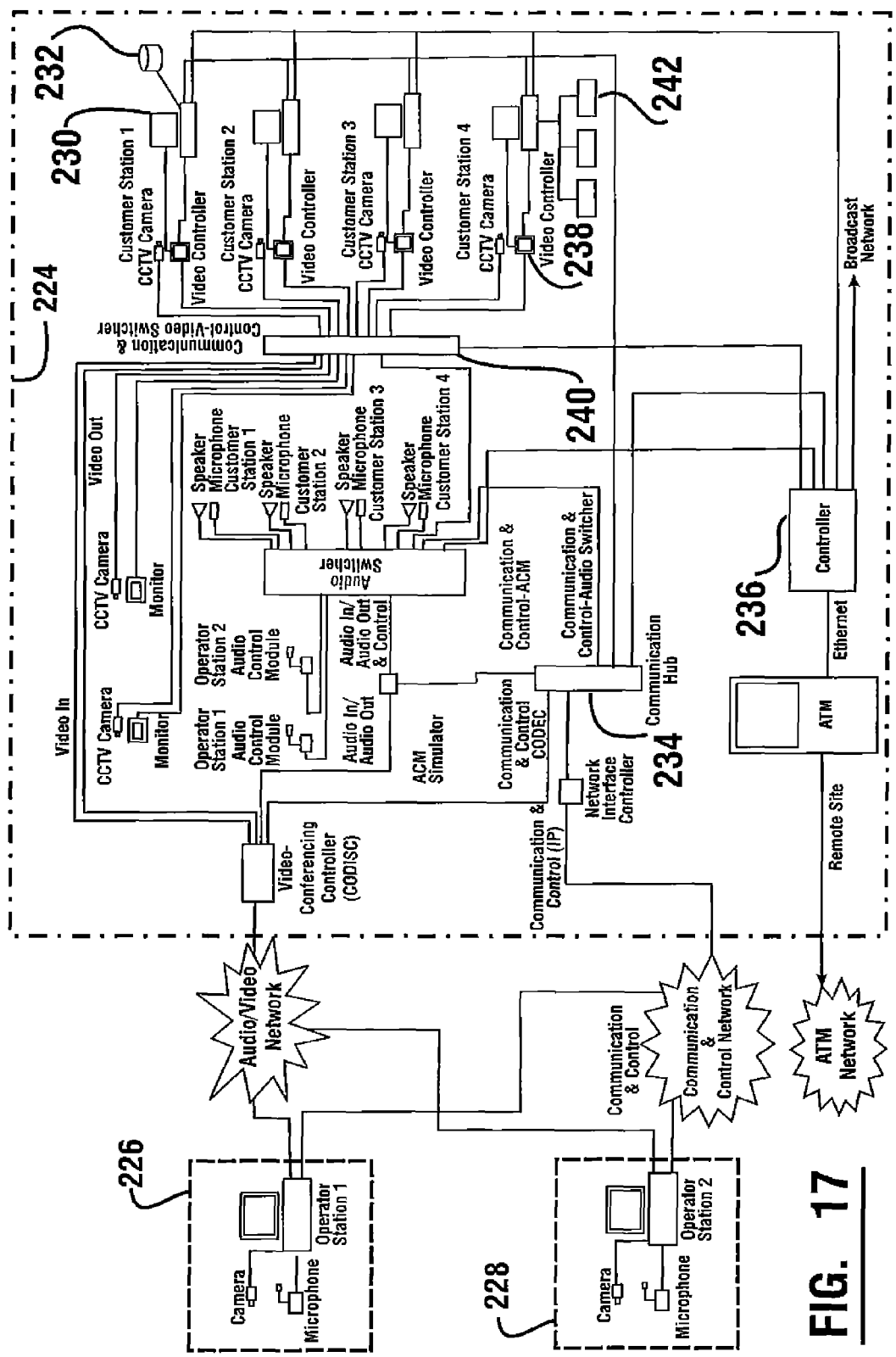
FIG. 17 is a further schematic view of a system in which local and remote service providers are enabled to communicate with customer stations that include resident controllers and transaction function devices.

FIG. 17 schematically represents a system similar to that shown in FIG. 16 except as otherwise indicated. In FIG. 17 a transaction facility 224 includes customer stations and local service provider stations that are enabled to communicate with a plurality of remote service provider stations 226,288. The system in FIG. 17 differs from the system represented in FIG. 16 in that the customer stations in addition to the ATM, each include a local processor schematically represented 230. Each local processor is operatively connected with a data store schematically represented 232. Each local processor in the exemplary embodiment is operatively connected to the controller 234 that serves as the communications hub. Each of the local processors 230 is operatively connected to the controller 236 which provides a source of audio and/or video content. Each local processor is connected through an interface 238 to the controller 240 which serves as a video switcher. Each local processor is also operatively connected to transaction function devices 242 which may in some exemplary embodiments include item delivering devices, input devices, output devices and other devices associated with carrying out transactions.

In the exemplary embodiment shown in FIG. 17 the local processors 230 are operative to have stored in their associated data stores 232, data representative of presentations that can be output through the audio and/or visual output devices at the customer station. These presentations may be produced based on outputs from the controller 236, inputs from the broadcast source or other sources. Such stored presentations may be similar to those described in the incorporated disclosure of U.S. patent application Ser. No. 09/449,426 filed Nov. 24, 1999. Responsive to inputs to input devices at the remote service provider stations, the communications hub is operative to cause a local processor to provide selected audio and/or visual outputs that correspond to the service provider inputs.

In addition the local processors are enabled to operate the transaction function devices 242 in accordance with their programming. The local processors are also enabled to transmit signals from the associated transaction function devices to the communications hub and to local and remote service providers through the communications and control network. The transaction function devices are also enabled to be operated responsive to inputs provided by local and remote service providers. In addition signals to and from the transaction function devices are appropriately routed and switched by the controllers to the appropriate devices and systems associated with the applicable local or remote service provider station that is conducting a transaction with the customer and the customer station.

Figure 18:
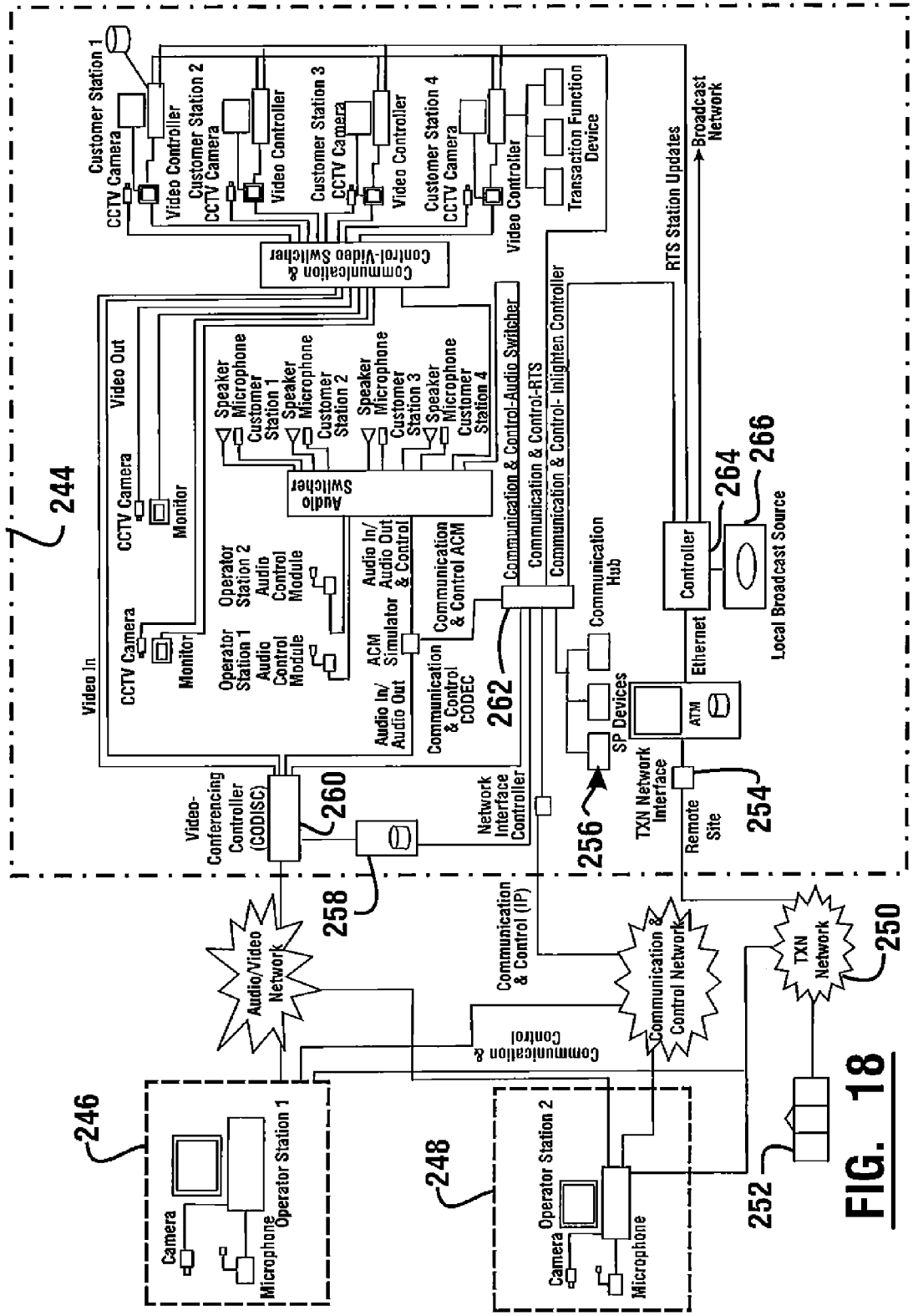
FIG. 18 is a schematic view of a further alternative system in which local and remote service providers are enabled to communicate with customer stations, carry out transactions, control transaction function devices at the customer station and selectively present audiovisual material corresponding to stored presentations at the customer station.

FIG. 18 schematically shows a further alternative system similar to that shown in FIG. 17 except as otherwise explained. The system of FIG. 18 has a transaction facility schematically indicated 234 and remote service provider stations 246 and 248. As represented in FIG. 18 remote service provider stations may be in operative communication with a transaction network 250 so as to communicate with financial transaction computers 252. Also as schematically indicated the communication and control network enables local service providers, the local processors at the customer stations, as well as those customer stations including ATMs, to be in communication with the transaction network 250. This communication is schematically shown through an interface controller 254. Also schematically represented in FIG. 18 are transaction devices 256 that are operated by local service providers. Such local service provider devices may be used to control transaction function devices selectively at service provider stations and/or to connect such devices to other appropriate devices or networks for purposes of carrying out transactions. In the exemplary embodiment shown local service providers as well as remote service providers are enabled to provide communications through the transaction network so as to enable the carrying out of financial transactions.

Also schematically represented in FIG. 18 is a content server schematically indicated 258. Content server 258 is operatively connected to the controller 260 which serves as the compression decompression device, as well as to controller 262 which serves as the communications hub. In the exemplary embodiment the content server is operative to distribute content such as presentations that make up marketing campaigns to the data stores associated with customer stations. In addition the content server may also serve to perform a customer relationship management CRM analysis. Such customer relationship management (CRM) analysis may determine appropriate marketing presentations or other content to present to specific customers, or categories of customers, during transactions. The transaction server may also operate to keep track of presentations that have been made to customers, as well as customer's responses thereto. Such information may be stored and analyzed in accordance with the programming of the content server or other computers so as to determine products and services that should be presented to customers, or to determine opportunities that customers may wish to take advantage of by speaking with local or remote service providers. Of course these approaches are exemplary and in other embodiments other approaches may be used.

Further, in the exemplary system shown in FIG. 18 controller 264 is also operatively connected to a local broadcast source 266. In this exemplary embodiment the local broadcast source comprises a device that is in contact with local media. Such a local broadcast source may include a server with a DVD player that serves to provide outputs that may be of interest to customers waiting during transactions or to persons who may be observing displays or other output devices either at customer stations or within the transaction facility before or after conducting transactions. Of course as represented in FIG. 18 controller 264 may also be a source of such content, or may obtain such content through communication with a remote broadcast source. Thus exemplary forms of a system may enable various types of presentations to be made either of a general or targeted nature for purposes of helping to carry out transactions as well as for entertaining and occupying customers.

Figure 19:
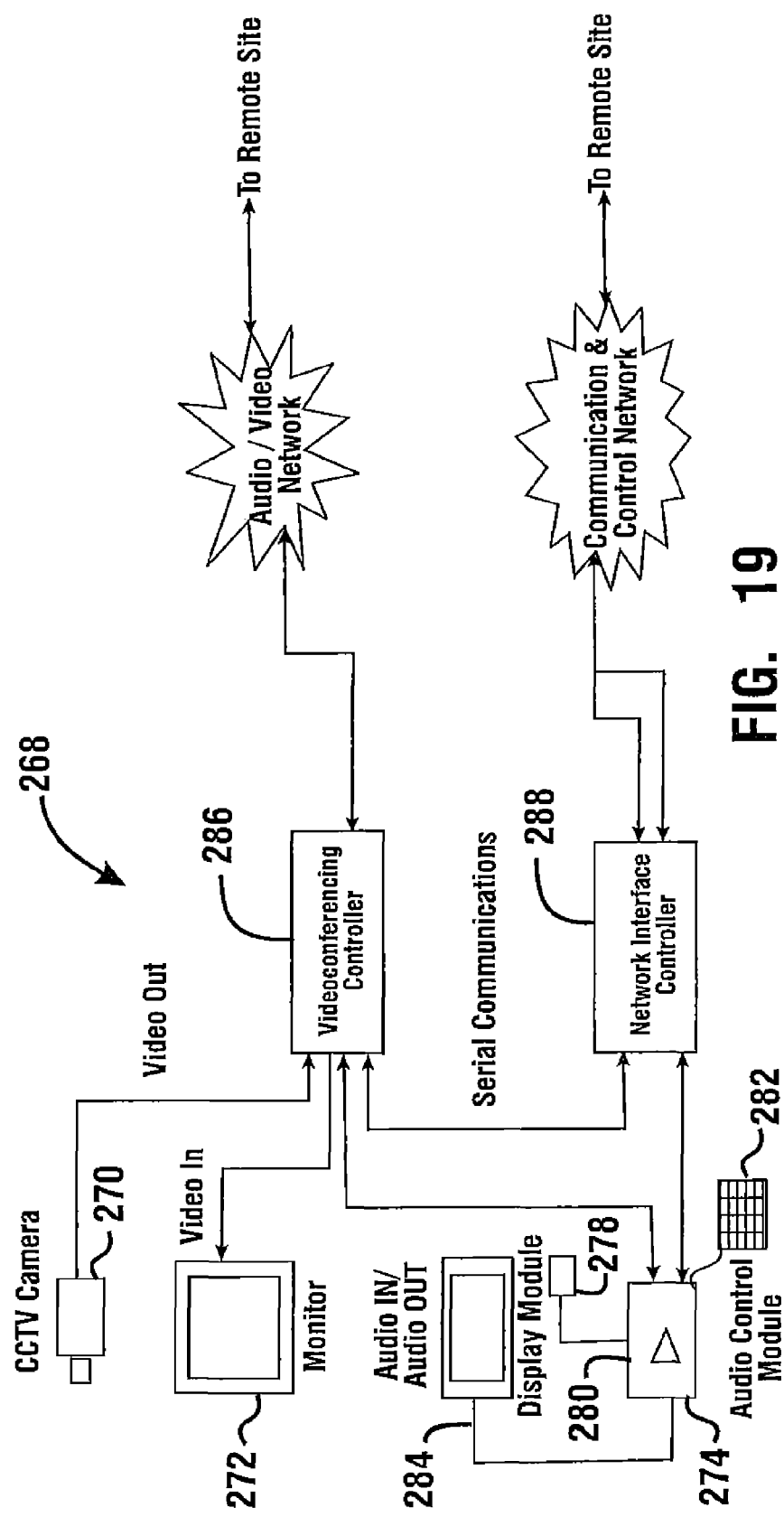
FIG. 19 is a schematic view of a first type of remote service provider station.
Figure 20:
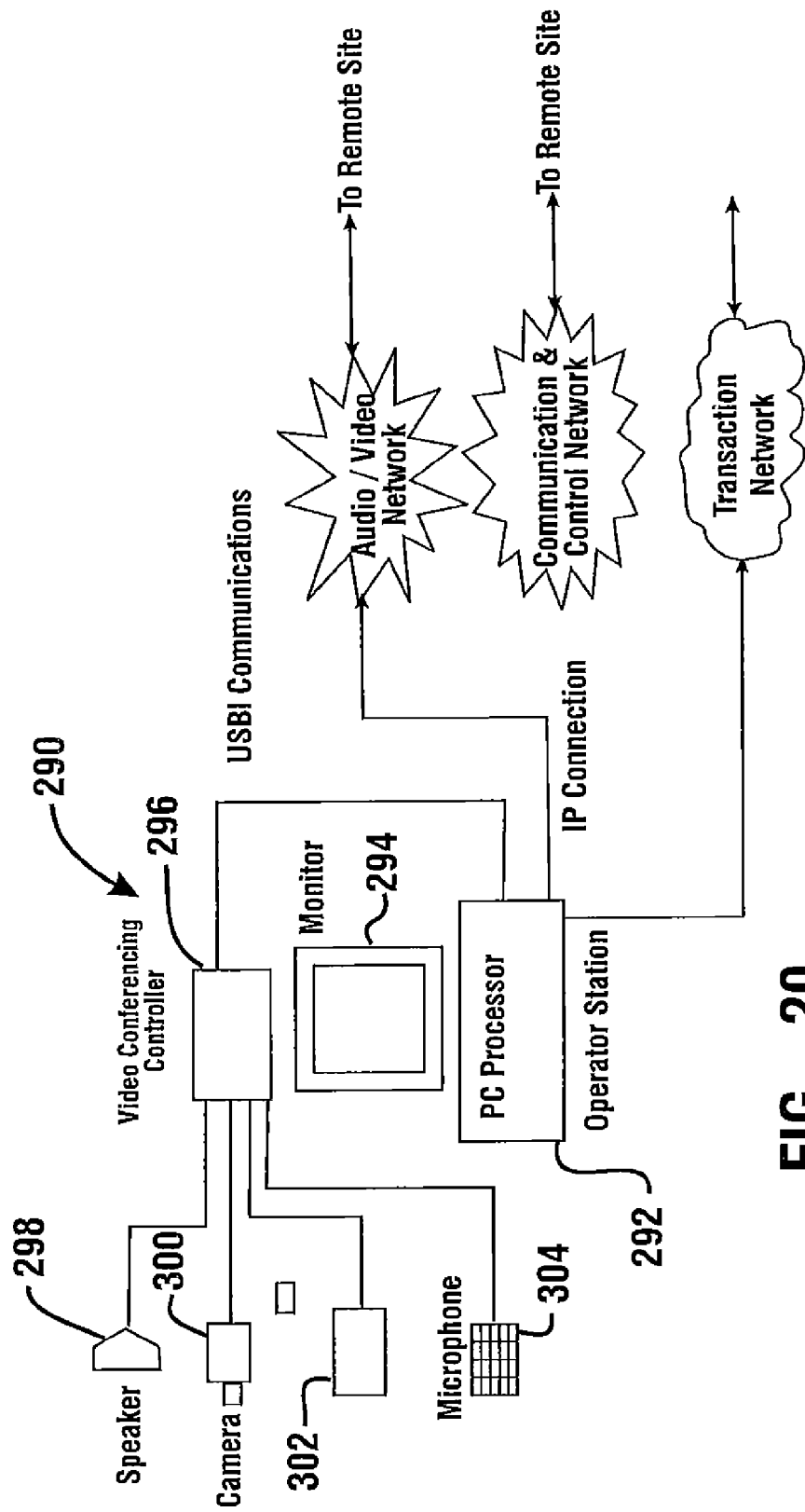
FIG. 20 is a schematic view of an alternative form of the remote service provider station.
Figure 21:
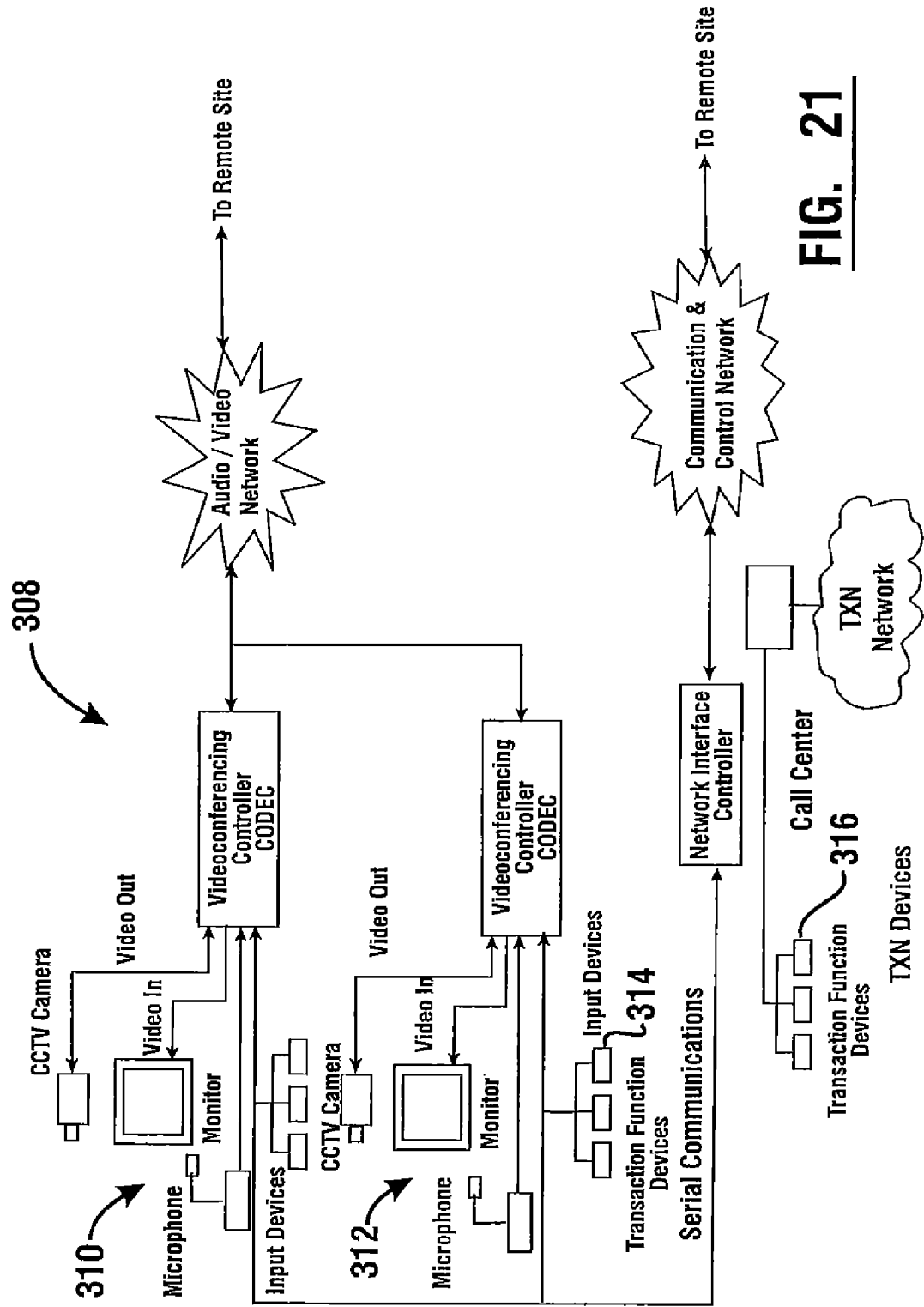
FIG. 21 is a schematic view of an alternative remote service provider station including a service provider station operating as a call center in which multiple service providers service remote customer transaction stations.

FIGS. 19-21 show alternative forms of remote service provider stations. FIG. 19 shows the components of a remote service provider station 268. Remote SP station 268 includes a camera 270 and screen 272 which serves as a visual output device. The remote SP station 268 further includes an audio control module 274. The audio control module 274 includes a microphone 278 which serves as an audio input device and a speaker 280 which serves as an audio transmitting device. The exemplary audio control module further includes at least one input device such as a keypad 282 as well as a display 284. The display 284 serves to provide the service provider with customer station information or data from transaction devices at the local SP station or customer station.

The remote SP station 268 further includes a controller 286. Controller 286 serves as a video conferencing controller as well as a compression and decompression device for purposes of communicating through an audio/video network. Remote SP station 268 further includes a network interface controller 288. Controller 288 is operative to provide communication and control signals to the transaction facility through a communication and control network. The network interface controller provides the controlling routing data for making the proper connections to the customer station or a local SP station. It also provides for the desired transmission of transaction and other data, and control of devices at the transaction facility. Of course it should be understood that although in this exemplary embodiment two separate controller devices are shown, and in other embodiments such controllers may be integrated into a single device such as a PC.

FIG. 20 shows an alternative remote service provider station generally indicated 290. SP station 290 includes a PC 292 which includes a processor and data store. PC 292 is in operative connection with a monitor 294 which serves as a visual output device. PC 292 is also in operative connection with a controller schematically indicated 296. Controller 296 is in operative communication with a speaker 298, camera 300, microphone 302 and input devices 304. Of course it should be understood that in some embodiments controller 296 may be integrated with the PC.

In this exemplary embodiment the PC 292 of the remote SP station performs the compression decompression function so as to communicate the audio and video signals with the transaction facility, and communicates communication and control signals. In addition the PC 292 may be operative to communicate with a transaction network so as to enable the carrying out of financial or other transactions responsive to inputs from the remote service provider.

FIG. 21 shows schematically yet another alternative form of a remote service provider station indicated 308. Service provider station 308 is in the nature of a call center in which multiple remote service providers may communicate with various transaction facilities and customer stations. Service provider station 308 includes operator stations 310, 312 at which a remote service provider may communicate with transaction facilities and customer stations. Also as indicated in FIG. 21, the operator stations may also include input devices 314 and transaction devices 316 so that service providers may communicate with and control devices at customer stations as well as to initiate financial or other transactions through appropriate networks. Of course it should be understood that these service provider station configurations are exemplary of many that may be used.

Figure 22:
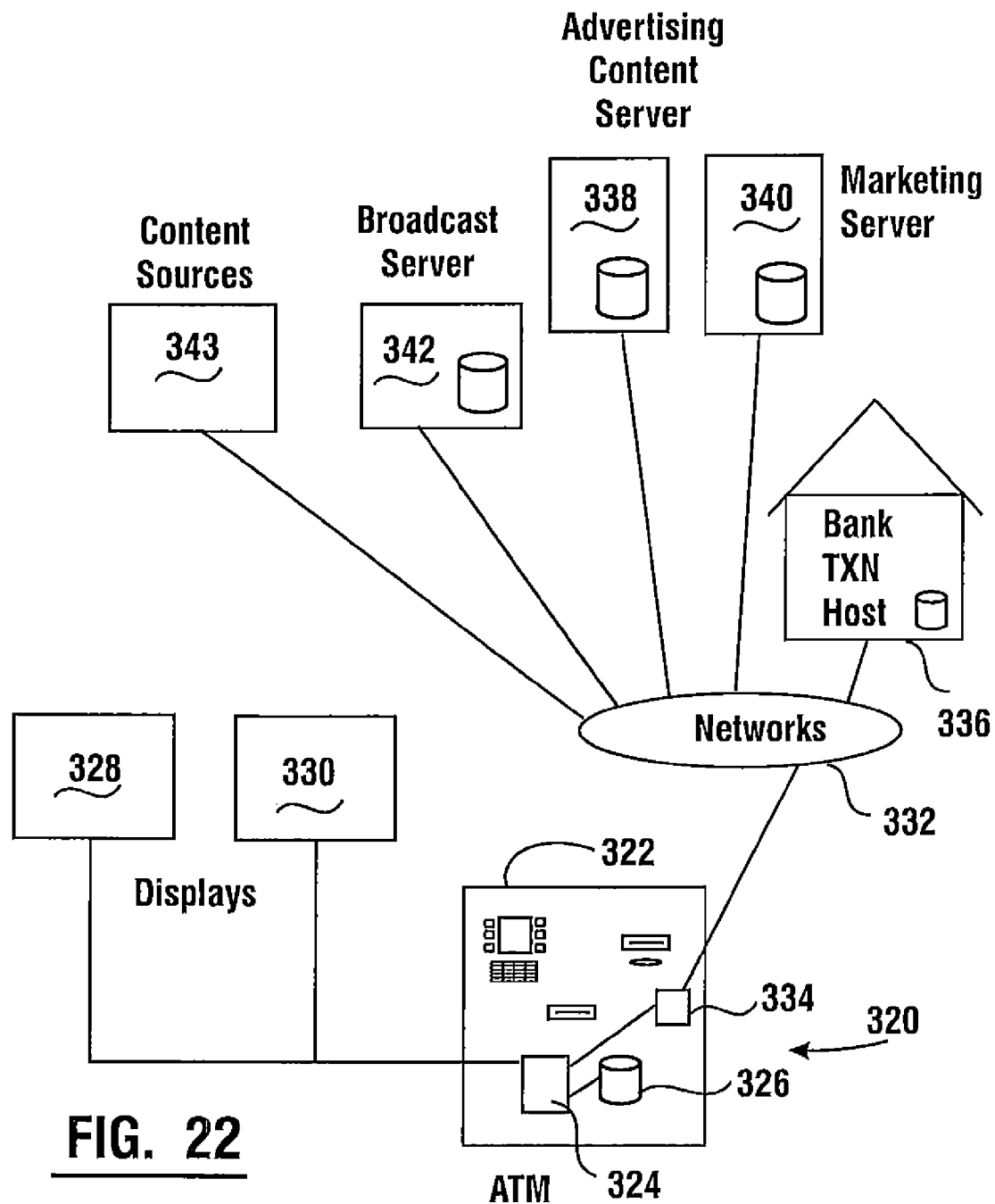
FIG. 22 is an alternative embodiment of an ATM system in which an ATM operates to store data corresponding to material received from one or more remote sources and to provide signals which provide outputs on external displays located in the facility in which the ATM is operated.

A further alternative exemplary system 320 is represented schematically in FIG. 22. System 320 may be integrated with systems of the type previously discussed or alternatively may operate independently of such systems.

System 320 includes an ATM 322. ATM 322 may be one of the types previously discussed herein or discussed in one of the incorporated disclosures. ATM 322 of the exemplary embodiment may include transaction function devices such as an ATM display, card reader, keypad, input keys, printers, check imager and cash dispenser. All of these devices are mounted in supporting connection with the ATM housing so as to be contained within the ATM of the exemplary embodiment. Of course in alternative embodiments, additional devices or multiple housings may be used.

ATM 322 further includes at least one processor schematically indicated 324. Processor 324 is in operative connection with at least one data store 326. Data store 326 includes data corresponding to computer instructions in the form of software. The software instructions, when executed by the processor, are operative to cause operation of the ATM to perform transactions for users, such as those functions discussed herein and in the incorporated disclosures. Computer software instructions executed by the processor may reside on articles such as a hard drive, solid state memory, DVD, CD, floppy disk, or other types of media. In some embodiments, data store 326 may comprise an article such as a hard drive. Alternatively in some embodiments the instructions stored in the data store 326 may be loaded from such an article through the use of a disk drive, computer port or other suitable mechanism in operative connection with the processor 324.

In the exemplary embodiment, the ATM 322 is in operative connection with one or more external displays 328 and 330. The displays are operated to provide outputs responsive to at least one external output signal that is provided by the ATM responsive to operation of the processor 324. Appropriate circuitry and drivers are included for providing outputs to the displays. Of course, as previously discussed, the displays may also incorporate or be in connection with audio output devices so as to enable providing visual and audio content. Alternatively or in addition, such displays may also include input devices for receiving inputs from users.

ATM 322 is also in operative connection with one or more networks schematically indicated 332. Networks 332 may include one or more local or wide area networks of the type previously discussed. Networks 332 may also include communications links or other suitable communications paths for communicating with remote or local devices. ATM 322 includes one or more communication devices schematically indicated 324. The communication devices are suitable for communicating with the devices connected in the networks.

In an exemplary embodiment the ATM is operative to communicate with one or more financial transaction computers, which is schematically indicated as a transaction host 336. The ATM of the exemplary embodiment is operative to communicate with the transaction host, and such communication is operative to cause the processor 324 to operate the ATM in accordance with its programming to carry out financial transactions.

Also operatively connected to the ATM in this exemplary embodiment is an advertising content server 338. The advertising content server of the exemplary embodiment is operative to deliver through the network 332, data corresponding to a plurality of advertising messages. The at least one processor 324 in the ATM is operative to receive the data corresponding to this plurality of advertising messages and to store data corresponding to such messages in the at least one data store 326 in a matter later discussed.

Also in operative connection with ATM 322 is a marketing computer 340 which is alternatively referred to herein as a marketing server. In the exemplary embodiment, communication between the ATM and the marketing server is operative to enable the ATM to output through the ATM display, or other displays, one or more advertising messages that are specifically targeted to the person using the ATM at that time.

The exemplary embodiment further includes at least one broadcast server 342. Broadcast server 342 of the exemplary embodiment generally includes data corresponding to content which may be used to cause video or audio outputs through output devices. Broadcast server 342 may be one of the types previously discussed. It may be a local or remote broadcast source. In some embodiments the broadcast server may be operated by an entity which compiles and/or produces programming for purposes of display in various establishments. Such programming may include, for example, information corresponding to recent news stories, recent sporting events, recent stock prices, weather forecasts, horoscope data, trivia, or other matters of general or special interest. Alternatively or in addition, the operator of the broadcast source may provide advertising messages of general interest to individuals who would be expected to frequent the facility in which the ATM or other devices are located which access data from the broadcast source, would likely have an interest. For example, this may include advertising for products of the particular financial institution in which ATM 322 is located. Of course these approaches are exemplary.

It should be understood that in some embodiments the broadcast source may include a plurality of sources such as content server 343. The plurality of content sources may provide data corresponding to various types of information. For example, a content server may provide information regarding weather forecasts, another content server may provide information corresponding to stock prices, and another content server may provide data corresponding to music or other audio material. In some embodiments, the content servers may include servers accessible at network addresses on the Internet. Of course in systems in which open networks are accessed, appropriate security measures such as firewalls, screening software and the like may be employed.

The exemplary embodiment of system 320 includes features discussed in the preceding disclosure as well in the incorporated disclosure of U.S. patent application Ser. No. 09/449,426 filed Nov. 24, 1999. In the exemplary embodiment, the at least one processor 324 of the ATM is operative to cause the ATM to communicate with the transaction host 336 to carry out financial transactions for customers at the ATM. Such transactions may include, for example, the customer providing a card to the card reader in the ATM such that card data corresponding to the customer and/or their account is read. The customer also provides other inputs through input devices of the ATM such as a PIN number, information regarding the type of transaction they wish to conduct as well as the amount of the transaction. The at least one processor 324 operates in accordance with its programming to cause the transaction function devices to operate to receive these inputs, and cause the ATM to communicate the nature of the requested transaction along with the card and PIN data to the transaction host 336. One or more computers which comprise the transaction host operates to determine if the requested transaction is authorized. The transaction host 336 then sends one or more messages to the ATM indicating whether the requested transaction is or is not authorized. If, for example, the requested transaction is a dispense of cash, and the message received by the ATM from the transaction host indicates that the transaction is authorized, the at least one processor 324 operates to provide outputs from the ATM display and to cause the cash dispenser in the ATM to dispense the cash to a user. The at least one processor also operates in accordance with its programming to send messages to the transaction host to indicate if the requested transaction was carried out appropriately. The at least one processor also operates in some embodiments to cause the ATM to carry out other functions such as to provide outputs, print receipts and other documents for the user, to make printed or electronic records related to transactions, to capture images of the user, instruments or other items, or to carry out other related functions in accordance with its programming. Of course these approaches are exemplary.

In addition, exemplary ATM 322 also operates in accordance with its programming to communicate with the advertising content server 338. The advertising content server is operative to transmit data corresponding to a plurality of advertising messages. The at least one processor 324 is operative to receive the data corresponding to the advertising messages and to store data in the at least one data store 326 of the ATM. As indicated in the incorporated disclosure, each of the plurality of advertising messages can be selectively accessed and outputs corresponding thereto can be output by the ATM through its display.

The at least one processor 324 of the exemplary ATM is also operative to communicate with broadcast server 342. Broadcast server 342 is operative to communicate data corresponding to content to the ATM. The data corresponding to the content is stored in the at least one data store 326. Alternatively or in addition, the ATM processor is operative to cause the ATM to communicate with a plurality of content sources and to receive data corresponding to information that can be provided by such content sources. Such sources may include, for example, sources which can provide data corresponding to recent stock prices. The ATM may download such information and store it in the data store. Further, as can be appreciated, the at least one processor of the ATM may be programmed to only periodically communicate with a particular content server or a broadcast source, and to modify data stored in the data store in accordance with data downloaded during such communications. In this way, the ATM may be operative to periodically update the information that is stored in the data store with more recent information.

As can be appreciated, the frequency and timing of communication between the ATM and the servers which provide content, may be controlled through the programming of the ATM. Alternatively, the downloading of such information may be controlled by messages from a broadcast server or a marketing server, or can be based on other factors to enable such communication on a scheduled or unscheduled basis.

In the exemplary embodiment, when the ATM is operated to perform a transaction for a user, card data read by the ATM is transmitted from the ATM to the marketing computer 340. In the exemplary embodiment, this occurs prior to the sending of the card data from the ATM to the transaction host. The card data corresponds to a particular user, or at least some attribute of the particular user. The marketing computer 340 is operative responsive to the card data to determine the nature of one or more advertising messages that the operator of the system or other responsible entity would like to have presented to the user at the ATM. In some embodiments, the messages may be targeted marketing which provides a presentation targeted to the particular user. In response to making such determination, the marketing computer 340 sends messages including data to the ATM 322. These messages include user presentation data. The at least one processor operates responsive to the user presentation data to cause the selected at least one user presentation to be selected from the data store and to be output through the output devices on the ATM. In some embodiments the user may be provided with a series of presentations with opportunities to provide responses, or alternatively may be presented with a series of presentations which comprise a sequence of messages that are intended to be presented to a user on successive ATM visits or otherwise at different times. The sequence of messages comprise a marketing campaign. Additional aspects of exemplary systems are described in the incorporated disclosures.

In an exemplary embodiment, the at least one processor 324 also operates to provide at least one external output signal from the ATM which is operative to cause outputs through the external displays. The outputs through the external displays may correspond to the data corresponding to broadcast content that the ATM received from content sources such as the broadcast server. In some exemplary embodiments, the outputs provided from the displays are generally run continuously when the ATM processor is operating. The outputs through the external displays are generally independent of the outputs through the ATM display, which outputs through the ATM display are determined through the communication between the ATM and the transaction host. Of course, as can be appreciated, in some embodiments the at least one processor in the ATM may be programmed to cause the general marketing information output through the display to also be output through the ATM display when the ATM is not carrying out a financial transaction or at times during transactions when no particular output is dictated by communication with the marketing computer.

Of course, as can be appreciated, in some embodiments the ATM may also be connected to other systems such as those described, that enable communication between service providers and customers at the ATM and which also enable service providers to control the output of presentations from the ATM as well as the external displays. Alternatively and/or in addition, such communication systems may be operative to cause the at least one processor in the ATM to store selected content in the data store, such that particular programming appropriate for the facility will output through the external displays in the particular facility in which the ATM is operated. Of course these approaches are exemplary, and in other embodiments other approaches may be used.

In still other exemplary embodiments the at least one processor 324 of the ATM may operate in accordance with programmed instructions including in the at least one data store 326 to carry out additional or alternative operations to facilitate communication with and marketing to ATM users as well as persons in the vicinity of the ATM. In such exemplary embodiments one or more reading devices may be in operative connection with the at least one processor. The reading devices of the exemplary embodiment are operative to read in a contactless manner, data which identifies a particular user. Such reading devices may include, for example, a reader which is operative to read radio frequency identification (RFID) cards or other articles. Such cards or articles may be of the type described in incorporated disclosure of U.S. patent application Ser. No. 10/814,100 filed on Mar. 31, 2004. An RFID reading device may operate for example to read identification data on a card in the possession of a person waiting to use the ATM but who has not yet input their ATM card or other device used to initiate ATM transactions, into operative connection with the ATM. In some embodiments the at least one processor may be programmed so as to discriminate between RFID signals by determining the signals which correspond to one or more users which are not in the midst of conducting a transaction with the ATM. This can be done based on the card data that is read by the card reader of the ATM to assure that the data which corresponds to a person who is waiting is identified.

In alternative embodiments the reading device may comprise a camera. The camera may be used to detect appearance features of a person within the camera's field of view. Signals from the camera showing a user's face can then be used to identify the particular person who is waiting to conduct a transaction at the ATM. This may be done, for example, in the manner described in U.S. Pat. Nos. 6,941,274 and/or 6,023,688, the disclosures of each of which are herein incorporated by reference.

In still other embodiments the reading device may comprise a reading device that operates to read biometric features. These devices may include, for example, a device which scans the iris of a user waiting to use the machine. Alternatively other types of biometric readers may be used such as devices which read patterns by a user's retina or other features. Of course these reading devices described are exemplary and in other embodiments other types of reading devices may be used.

In exemplary embodiments the at least one processor may operate in accordance with its programming to receive the signals that identify a user waiting to use the ATM. Based on this information the at least one processor may cause the ATM to communicate with one or more remote servers. The communication with the remote servers may include data which corresponds to the data read by the reading device which can be used by the remote server to identify the particular individual waiting to use the ATM, or at least one attribute of that particular individual. Such a remote server may be the marketing server 340 previously discussed, or may be additional or different servers.

The remote server of this exemplary embodiment is operative to determine the particular marketing presentation to be provided to the user waiting to use the ATM. The remote server then sends a message to the ATM including data representative of the presentation Responsive to receiving the data identifying the particular marketing presentation to be made to the user waiting to operate the machine, the at least one processor in the ATM is operative to output the particular marketing presentation through one or more of the external displays 328, 330. This can be done in an exemplary embodiment while the ATM is being operated to conduct a transaction by a different user, and while the screen displays output from the ATM are being controlled by the at least one processor responsive to communications between the ATM and the ATM transaction host.

Thus in this exemplary embodiment the user waiting to operate the ATM may receive a marketing message targeted to the particular user from the external displays while waiting to use the ATM. In addition in some embodiments the data corresponding to marketing presentations stored in the at least one data store 326 of the ATM may include a plurality of sequences. As previously discussed, the exemplary sequences comprise a plurality of marketing presentations that are related and are developed to be presented to ATM users at different times. Thus for example messages in a sequence can be presented to a user on different ATM visits as discussed in the incorporated disclosures. However, in some exemplary embodiments when a user has received a marketing presentation included in a sequence through one of the external displays while waiting for the ATM, the at least one processor in the ATM may operate to present the user with the next advertising message in the sequence when the user is shortly thereafter conducting a transaction at the ATM. This can be done by identifying the user through the card data included on their card which is read through operation of the card reader on the ATM. Alternatively or in addition, the ATM may include a contactless reading device of the type previously described so as to identify the particular user who has moved to a position to conduct a transaction at the ATM. This enables a user in an exemplary embodiment to receive two marketing messages in the sequence in relatively rapid succession. Further as discussed in the incorporated disclosures, in situations where later messages in a sequence require responses from a user such as to accept or decline an offer, the later messages can be presented through the ATM at which time the user may provide the necessary responses. Of course these approaches are exemplary and in other embodiments other approaches may be used.

In still other embodiments reading devices may be positioned adjacent to or otherwise in a position so as to sense data associated with a user that is adjacent to the particular external display. In such embodiments the at least one processor may operate in accordance with its programming to cause each external display to output a different marketing message. The marketing message output through a display may be specifically targeted to the waiting user who is positioned adjacent thereto. Thus for example a user waiting adjacent to an external display may receive one targeted marketing message, while at the same time another user that is waiting adjacent to a different external display will receive a different targeted marketing message. Each message will be specifically targeted to the particular adjacent user.

In some embodiments the at least one processor may cause the output through the external displays, of content of general interest received from the broadcast server at times when no user is sensed as waiting in proximity to one of the external displays. Then when a user is sensed as waiting, and responsive to the reading device reading data corresponding to a waiting user, the at least one processor will operate to cease the output of the general broadcast content from the particular display and to output the targeted marketing message. Once the targeted marketing message has been output, the at least one processor may operate in accordance with its programming to resume the output of the general interest material. As previously discussed the continuation of the general interest material can be done in various embodiments from the point of interruption or at a point which corresponds to the output of general interest content through other displays that are located in the vicinity of the ATM.

Further in some exemplary embodiments the area in the vicinity of the ATM may be arranged such that users are encouraged to be positioned adjacent to one or more displays before operating the ATM. For example users may be guided by marked aisles and dividers to stand adjacent to a wall including a series of external displays or other external display devices. Reading devices associated with each of the displays may then read the data corresponding to each user adjacent to a display. The at least one processor may then operate to provide through a respective display at least one targeted marketing message for the user that is sensed as waiting adjacent thereto. Further as the user moves from a position adjacent to one display to another position adjacent another display, sequential messages included in an advertising sequence may be output. Of course these approaches are exemplary and in other embodiments other approaches may be used.

In still other embodiments users waiting to use an ATM may receive targeted messages responsive to operation of the at least one processor, through a medium other than the external displays. For example the at least one processor may have in operative connection therewith communication devices 334 that enable communication with portable electronic devices carried by users. These may be, for example, personal digital assistants or cell phones. The ATM may include a wireless communication device such as a radio frequency (RF) device that is capable of communicating with such portable wireless devices. This may include a cell phone communicator or other device that can deliver at least one external message which results in a message being communicated to a particular user. These messages may include for example text messages output on a display of a personal digital assistant (PDA) or cell phone. Alternatively the ATM can include operating in the at least one processor, software that provides an audible output that can be received audibly through a cell phone. Such software may include, for example, text to speech software or other software that is operative to selectively produce at least one external signal that causes an audible output through the portable device to the user.

In such exemplary embodiments reading devices of the type previously discussed or other suitable types, may be used to read data that identifies a particular user waiting to use the ATM. The at least one processor operates to communicate data corresponding to the read user identifying data to one or more remote servers. The one or more remote servers that operate in accordance with their programming to provide a response message to the ATM which includes data that identifies the particular marketing message to provide to the identifying user. In addition in situations where the user is to receive the marketing message through a portable electronic device, the at least one remote server may include with its responsive message, address data which indicates to the at least one processor how to address the marketing message to the particular user. This address data may include, for example, a phone number of a user's cell phone to which the message may be directed. Alternatively or in addition, the message from the remote server may include address data such as an e-mail or other address that corresponds to address data such as an address to which text messages to the user may be sent. Of course these approaches are exemplary and in other embodiments other approaches may be used.

The at least one processor operates responsive to the information received from the at least one remote server to present the at least one marketing message that corresponds to the data included in the message or messages received from the remote server and to operate the at least one communication device in the ATM to send the message to a user. The message which comprises at least one external message output from the ATM, may be received by a user on their cell phone, personal digital assistant or other device while they are waiting to use the ATM. This message may include marketing messages of the type previously discussed which are targeted to the particular user. In addition or in the alternative, the marketing messages may be part of a sequence of messages that are presented to users. In addition in some embodiments the messages from the sequence that are transmitted to the user may include messages to which a user is expected to respond. Such messages may be sent because the presentation of the information to the user through a cell phone or a PDA enables a user to provide responsive inputs which enables the making of selections or enables the user to indicate whether they accept or decline a particular marketing offer.

In still other embodiments the at least one processor of the ATM may operate to provide targeted marketing messages to users through installed external displays as well as through external messages that are transmitted to portable electronic devices. This enables marketing presentations where a user is enabled to view selections, promotions, items, merchandise, or other things through displays and at the same time respond through inputs to a portable device, such as a cell phone or personal digital assistant. Thus for example a user waiting to use the ATM may be presented with graphics corresponding to products or services through an adjacent external display, while at the same time receive explanations related to the products or services such as pricing information or other pertinent data through their cell phone or text messaging device. This may facilitate a user's ability to make product selections and to indicate their desire to acquire the displayed goods or services through their cell phone or personal digital assistant. The at least one processor of the ATM may operate itself or in conjunction with other connected computers, to correlate and act in response to the external display outputs and the user's concurrent device inputs. This enables determining the user's desired transactions.

In addition or in the alternative, in some embodiments the at least one processor may operate to receive the inputs from the user waiting to use the machine which indicate that the user has elected to make a purchase of the displayed goods or services. The at least one processor may then operate to communicate with the transaction host or other remote servers to authorize the transaction or otherwise take the necessary steps to transfer the funds associated with a customer's desired transaction. When the customer reaches the ATM the ATM may then operate responsive to the operation of the at least one processor to identify the user as one that has indicated that they wish to carry out the particular previously requested transaction. This may be done through the reading of the user's card and the card data thereon through a card reader of the ATM, or through operation of another reading device as discussed. The ATM may then operate in accordance with its programming to ask the user to provide inputs which are consistent with the transaction that they have elected to do. This may include for example providing an output through the ATM display asking the user to provide an input to confirm the transaction. Alternatively or in addition, customized outputs may be provided to the user in response to which the user has to provide inputs as appropriate for the particular transaction which they have previously selected. As can be appreciated, the fact that the user has received marketing presentations, provided inputs and performed other transaction steps before reaching the ATM, may operate to enable the ATM to speed financial aspects of the selected transactions once the user has reached the ATM. Of course it should be understood that these approaches are exemplary and in other embodiments other approaches may be used.

Thus, the new transaction systems and methods of the exemplary embodiments achieve one or more of the above stated objectives, eliminate difficulties encountered in the use of prior devices and systems, solve problems, and attain the desirable results described herein. In the foregoing description, certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown or described.

In the following claims, any feature described is a means for performing a function shall be construed as encompassing any means known to those skilled in the art to be capable of performing the recited function and shall not be deemed limited to the particular means shown performing the function in the foregoing description, or mere equivalents thereof.

Having described the features, discoveries, and principles of the invention, the manner in which it is constructed and operated and the advantages and use of results attained; the new and useful, structures, devices, elements, arrangements, parts, combinations, systems, equipment, operations, methods and relationships are set forth in the appended claims.

We claim:

1. Apparatus comprising:
  a banking system including a plurality of transaction terminals,
    wherein each respective terminal includes at least one reader operable to read user data usable to identify a financial account on which financial transactions can be carried out,
    wherein each respective terminal is operable to allow a user of the respective terminal to request a check cashing transaction responsive at least in part to the user being recognized as an authorized terminal user based at least in part on computer-determined correspondence between user data read by the at least one reader and authorized terminal user information stored in at least one data store,
    wherein each respective terminal includes a cash acceptor,
      wherein the cash acceptor is operable to receive cash from authorized terminal users,
    wherein each respective terminal includes a check acceptor,
      wherein the check acceptor is operable to receive checks from authorized terminal users,
    wherein each terminal includes a check imager,
      wherein the check imager is operable to capture an image of at least one side of a check received by the check acceptor,
    wherein each terminal includes a cash dispenser,
  a teller station remotely located from the plurality of terminals,
    wherein the teller station includes a teller input device,
    wherein each respective terminal includes at least one computer,
      wherein for each respective terminal,
        the at least one computer is operable to resolve from images captured by the check imager, check data including a check amount, and
        the at least one computer is operably responsive at least in part to at least one input to the teller input device, to cause the cash dispenser to dispense to an authorized terminal user, a cash amount that corresponds to a check amount resolved from an image captured by the check imager of a check received by the check acceptor,
    wherein the teller station includes a communication selector unit, wherein the communication selector unit allows a teller to selectively establish two-way audio and video communication with a respective customer at each of the terminals,
wherein the teller station includes a queuing indicator,
wherein the queuing indicator is linked to the check imager of each respective terminal,
wherein the queuing indicator is operable to display a queue of session identifiers respectively corresponding to in-progress user sessions at respective terminals,
wherein the queue indicates an order in which user session customers are to be sequentially served by a teller,
wherein a session identifier for an in-progress user session which has continued for a predetermined time length after operation of the check imager of the terminal, has queue order priority over a session identifier for the longest in-progress user session.

2. The apparatus according to claim 1 wherein the transaction terminals comprise automated banking machines,
wherein the at least one reader includes
at least one card reader and at least one biometric reader,
wherein the at least one computer is operative during a transaction to
cause card data to be read from a customer card through operation of the at least one card reader, and
cause biometric data to be read from a customer through operation of the at least one biometric reader,
wherein the at least one computer is operative to cause the read card data to be compared with card information stored in the at least one data store,
wherein the at least one computer is operative to cause the read biometric data to be compared with biometric information in the at least one data store,
wherein a customer is authorized to request a check cashing transaction responsive at least in part to both
computer-determined correspondence between the read card data and stored card information, and
computer-determined correspondence between the read biometric data and stored biometric information.

3. Apparatus comprising:
a teller station,
wherein the teller station includes a queuing indicator,
wherein the queuing indicator is in operative connection with at least one customer sensor operable to detect customers at a plurality of transaction terminals, which are operable by respective customers of a banking system using a respective banking account associated with the banking system to conduct each of a cash-depositing transaction and a cash-receiving transaction,
wherein the queuing indicator is operable based at least in part on the at least one customer sensor, to display queuing information indicating an order in which customers at transaction terminals are to be sequentially served by the teller station,
wherein the teller station includes at least one terminal communication selector unit,
wherein the at least one terminal communication selector unit allows the teller to selectively establish two-way audio and video communication with a respective customer at each respective transaction terminal,
wherein the teller station allows the teller to be simultaneously involved with different transactions being conducted at different transaction terminals,
wherein during two-way audio and video communication with a transaction terminal customer conducting a transaction, the teller is able to cause advertising material to be presented to other transaction terminal customers that are conducting other transactions with which the teller is simultaneously involved,
wherein the teller station includes at least one teller output device,
wherein the at least one teller output device includes at least one teller display,
wherein the teller station includes at least one teller input device operable to receive input from the teller,
wherein the at least one teller input device is in operative connection with the queuing indicator,
wherein at least one first input to the at least one teller input device is operative to cause
two-way audio and video communication to be established between the teller and a first customer at a first terminal that is to be served next based on the queuing information, and
the at least one teller display to output transaction data associated with the first customer,
wherein responsive at least in part to the outputted transaction data associated with the first customer corresponding to a customer authorized to conduct a cash-receiving transaction, the teller is operative to cause through at least one second input to the at least one teller input device, cash to be delivered to the first customer at the first terminal.

4. The apparatus according to claim 3
wherein each respective transaction terminal includes at least one computer, a check acceptor, a check imager, and at least one reader operable to read user data usable to identify a financial account on which financial transactions can be carried out,
wherein the check imager of a respective terminal is operable to capture at least one image of at least one side of a check received by the check acceptor of the respective terminal, and
wherein the at least one computer of the respective terminal is operable to resolve check data from the at least one image captured by the check imager of the respective terminal,
wherein the at least one first input to the at least one teller input device is operative to cause the at least one teller display to output transaction data that includes check data resolved by the at least one computer of the respective terminal.

5. The apparatus according to claim 3 wherein the queuing indicator is operable based at least in part on the at least one customer sensor detecting customers at a plurality of transaction terminals that comprise automated banking machines.

6. The apparatus according to claim 5 wherein the automated banking machines are operable by authorized customers to conduct a cash-receiving transaction that includes at least one of a cash withdrawal transaction and a check cashing transaction.

7. The apparatus according to claim 6
wherein each respective automated banking machine includes at least one computer, a check acceptor, and a check imager, wherein a respective check imager is operable to capture an image of at least one side of a check received by a respective check acceptor, wherein the at least one computer is operable to resolve check data from images captured by the check imager, wherein the check data includes a check amount.

8. The apparatus according to claim 6 wherein each respective automated banking machine includes a respective cash dispenser that is in operative connection with the at least one teller input device, wherein teller input to the at least one teller input device is operative to cause a respective cash dispenser to dispense cash.

9. The apparatus according to claim 3 wherein the teller station is connected to each respective transaction terminal by a respective item conveyor system, wherein each respective item conveyor system is operable to physically move at least one item between the teller station and the respective transaction terminal.

10. The apparatus according to claim 9 wherein each item conveyor system includes a pneumatic tube.

11. The apparatus according to claim 9 wherein the teller station and the transaction terminals are located in a same building.

12. A method comprising:

(a) operating at least one queuing indicator at a teller station to display queuing information, wherein the queuing indicator is in operative connection with at least one customer sensor operable to detect customers at a plurality of transaction terminals, which are operable by respective customers of a banking system using a respective banking account associated with the banking system to conduct each of a cash-depositing transaction and a cash-receiving transaction, wherein the queuing indicator is operable to display the queuing information based at least in part on the at least one customer sensor, wherein the teller station includes at least one terminal communication selector unit, wherein the at least one terminal communication selector unit allows the teller to selectively establish two-way audio and video communication with a respective customer at each respective transaction terminal, wherein the teller station allows the teller to be simultaneously involved with different transactions being conducted at different transaction terminals, wherein during two-way audio and video communication with a transaction terminal customer conducting a transaction, the teller is able to cause advertising material to be presented to other transaction terminal customers that are conducting other transactions with which the teller is simultaneously involved, wherein the teller station includes at least one teller output device, wherein the at least one teller output device includes at least one teller display, wherein the teller station includes at least one teller input device operable to receive input from the teller, wherein the at least one teller input device is in operative connection with the queuing indicator, wherein the queuing information displayed indicates an order in which customers at transaction terminals are to be sequentially served by the teller station;

(b) operating the at least one teller input device to receive at least one first input, wherein the at least one first input causes:

(bi) two-way audio and video communication to be established between the teller and a first customer at a first terminal that is to be served next based on the queuing information, and (bii) the at least one teller display to output transaction data associated with the first customer; and (c) operating the at least one teller input device to receive at least one second input, responsive at least in part to the transaction data output in (bii) corresponding to a customer authorized to conduct a cash-receiving transaction, wherein the at least one second input causes cash to be delivered to the first customer at the first terminal.

13. The method according to claim 12 wherein each respective transaction terminal includes at least one computer, a check acceptor, a check imager, and at least one reader operable to read user data usable to identify a financial account on which financial transactions can be carried out, wherein the check imager of a respective terminal is operable to capture at least one image of at least one side of a check received by the check acceptor of the respective terminal, and wherein the at least one computer of the respective terminal is operable to resolve check data from the at least one image captured by the check imager of the respective terminal, wherein the at least one first input received in (b) causes the at least one teller display to output transaction data that includes check data resolved by the at least one computer of the first terminal.

14. The method according to claim 12 wherein the queuing indicator is operable based at least in part on the at least one customer sensor detecting customers at a plurality of transaction terminals that comprise automated banking machines, wherein (a) includes displaying queuing information that indicates an order in which customers at automated banking machines are to be sequentially served by the teller station.

15. The method according to claim 14 wherein the automated banking machines are operable by authorized customers to conduct a cash-receiving transaction that includes at least one of a cash withdrawal transaction and a check cashing transaction, wherein (c) includes causing cash to be delivered in a cash withdrawal transaction or a check cashing transaction.

16. The method according to claim 15 wherein each respective automated banking machine includes at least one computer, a check acceptor, and a check imager, wherein a respective check imager is operable to capture an image of at least one side of a check received by a respective check acceptor, wherein the at least one computer is operable to resolve check data from images captured by the check imager, wherein the check data includes a check amount, wherein (bii) includes operating the at least one teller display to output transaction data that includes check data resolved from images captured by the check imager, wherein (c) includes causing a cash amount corresponding to a check amount to be delivered in a check cashing transaction.

17. The method according to claim 15
wherein each respective automated banking machine includes a respective cash dispenser that is in operative connection with the at least one teller input device,
wherein (c) includes causing the cash dispenser at the first terminal to dispense cash to the first customer.

18. The method according to claim 12 wherein the teller station is connected to each respective transaction terminal by a respective item conveyor system,
wherein (c) includes causing an item conveyor system to physically move cash from the teller station to the first terminal.

19. The method according to claim 18 wherein each item conveyor system includes a pneumatic tube,
wherein (c) includes using a pneumatic tube to physically move cash from the teller station to the first terminal.

20. The method according to claim 18 wherein the teller station and the transaction terminals are located in a same building,
wherein (c) includes causing the item conveyor system to physically move cash from a first area of the building to a second area of the building, wherein the first area is a secured area.

* * * * *